(12) United States Patent
Moriyama et al.

(10) Patent No.: US 8,723,928 B2
(45) Date of Patent: May 13, 2014

(54) THREE-DIMENSIONAL SHAPE MEASURING APPARATUS, INTEGRATED CIRCUIT, AND THREE-DIMENSIONAL SHAPE MEASURING METHOD

(75) Inventors: Takaaki Moriyama, Osaka (JP); Akira Uesaki, Osaka (JP); Tadashi Yoshida, Osaka (JP); Yudai Ishibashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1083 days.

(21) Appl. No.: 12/677,373

(22) PCT Filed: Jul. 10, 2009

(86) PCT No.: PCT/JP2009/003238
§ 371 (c)(1),
(2), (4) Date: Mar. 10, 2010

(87) PCT Pub. No.: WO2010/004763
PCT Pub. Date: Jan. 14, 2010

(65) Prior Publication Data
US 2011/0001793 A1    Jan. 6, 2011

(30) Foreign Application Priority Data
Jul. 11, 2008  (JP) ................................. 2008-181540

(51) Int. Cl.
*H04N 7/18*    (2006.01)
*H04N 13/04*   (2006.01)

(52) U.S. Cl.
CPC ................................ *H04N 13/0497* (2013.01)
USPC ............................................. 348/51; 348/43

(58) Field of Classification Search
CPC .......... H04N 13/4097; H04N 13/0404; H04N 13/0409
USPC ....................................................... 348/36–61
See application file for complete search history.

(56) References Cited

U.S. PATENT DOCUMENTS 8,243,125 B2 * 8/2012 Tomisawa et al. .............. 348/51
2008/0152192 A1   6/2008 Zhu et al.

FOREIGN PATENT DOCUMENTS

| JP | 2001-330915 | 11/2001 |
|---|---|---|
| JP | 2001-338278 | 12/2001 |
| JP | 2002-95016  | 3/2002 |
| JP | 3574044     | 10/2004 |
| WO | 2007/008715 | 1/2007 |

OTHER PUBLICATIONS

International Search Report issued Sep. 15, 2009 in International (PCT) Application No. PCT/JP2009/003238.

* cited by examiner

*Primary Examiner* — Andy Rao
(74) *Attorney, Agent, or Firm* — Wenderoth, Lind & Ponack, L.L.P.

(57) ABSTRACT

It is possible to perform three-dimensional shape measurement with easy processing, regardless of whether an object is moving or not. An image capturing unit (103) captures a captured image (I) including both a real image (I2) of the object (113R) and a mirror (101). A light amount changing unit (63a) changes a light amount of a virtual image (I1). An image separating unit (captured image separating unit 104) specifies, as a virtual image (Ib1), an image in a region having a different light amount (R1), in a captured image (Ia) in which the light amount is changed and a captured image (Ib) in which the light amount is not changed, and specifies an image in a region having the same light amount (R2) as a real image (Ib2). A three dimensional shape is reconstructed from the real image and so on that are specified.

15 Claims, 24 Drawing Sheets

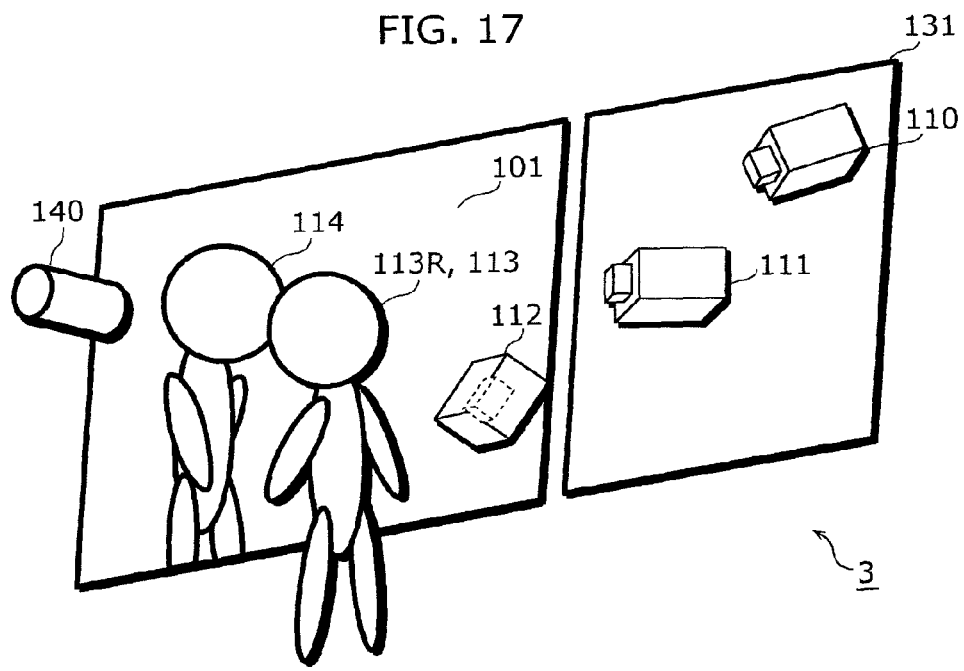
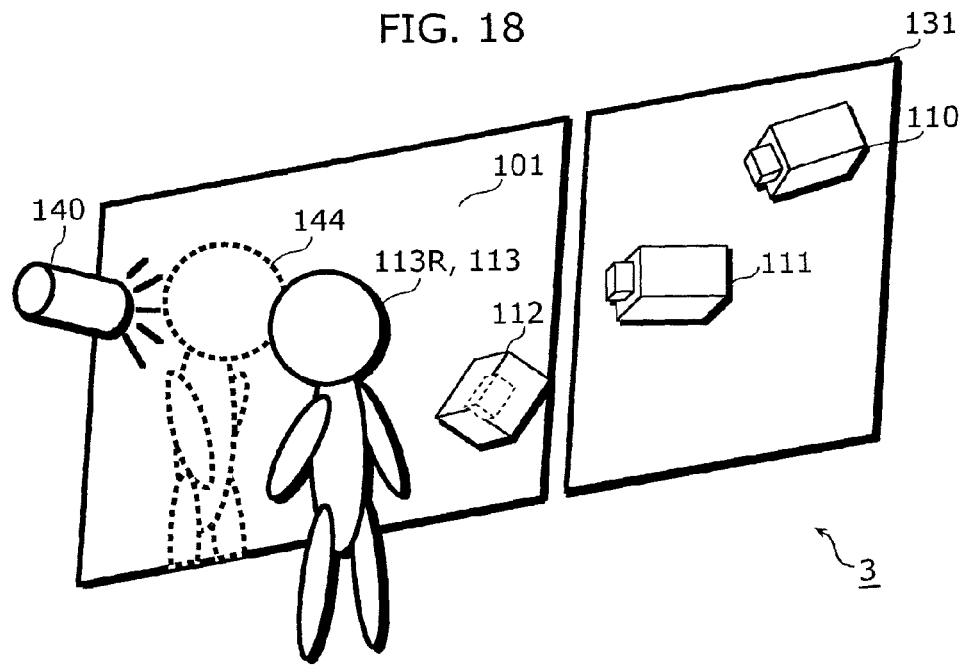

THREE-DIMENSIONAL SHAPE MEASURING APPARATUS, INTEGRATED CIRCUIT, AND THREE-DIMENSIONAL SHAPE MEASURING METHOD

TECHNICAL FIELD

The present invention relates to a method for performing three-dimensional measurement on an object, and an apparatus for the measurement using a mirror, based on a virtual image reflected in the mirror.

BACKGROUND ART

For a conventional three-dimensional shape measuring apparatus, a light-section method is used which is to: irradiate an object with a laser slit beam, capture a positional relationship of the slit beam on the object using a camera so as to measure a distance from the object, and reconstruct a three dimensional shape of the object. Another method is a volume intersection method which is to estimate an outer shape of the object by installing cameras all round the object so as to eliminate blind spots and superimposing silhouettes three-dimensionally, based on a silhouette image of the object captured by each of the cameras and the camera position.

In performing three-dimensional reconstruction of the object according to the above method, the reconstruction becomes more accurate when more cameras are used. However, since it is necessary to perform calibration on each of the cameras, there is a contradiction that it becomes more difficult to perform calibration when more cameras are used.

Thus, as a technique to reduce the number of cameras while at the same time maintaining the accuracy, it is possible to consider capturing, using a single camera, images of both the front and a blind spot for the camera by reflecting the blind spot in a mirror so as to perform three-dimensional reconstruction on the blind spot. As a practical method for obtaining an image of the blind spot using the mirror, one of the suggested techniques is to: first, measure a visible portion of the object by the light-section method, and cut out only the blind spot reflected in the mirror with reference to the coordinates of the object and the known coordinates of the mirror, so as to obtain the result of the three-dimensional reconstruction of the blind spot.

CITATION LIST

Patent Literature

[Patent Literature 1] Japanese Patent No. 3574044.

SUMMARY OF INVENTION

Technical Problem

Patent Literature 1 discloses separating a real image corresponding to a visible spot from the camera and a virtual image reflected in the mirror. However, the technique does not allow the three-dimensional reconstruction of the portion reflected in the mirror, without performing three-dimensional reconstruction on a real image portion by the light section method so as to determine the coordinates in the apparatus and then performing another three-dimensional reconstruction on a virtual image portion. Furthermore, there is another problem that the light-section method is not suitable for measuring a moving object like a human object because it requires time to perform the measurement.

The present invention is to solve the above problems peculiar to the conventional technique, and it is an object of the present invention to solve the problem of separating the real and virtual images generated from using the mirror, and also to provide a method and an apparatus for performing three-dimensional reconstruction of the object by using the mirror quickly. In other words, a first object of the present invention is to separate the real and virtual images by simple processing, and also perform the measurement accurately even when the object is moving. Thus, a second object of the present invention is to provide a three-dimensional shape measuring apparatus which can perform three-dimensional shape measurement by simple processing, and which can further perform the measurement accurately even when the object is moving (see Patent Literature 1).

Solution to Problem

To solve the conventional problem described above, a three-dimensional shape measuring apparatus according to the present invention is configured as below.

In other words, the three-dimensional shape measuring apparatus according to the present invention is a three-dimensional shape measuring apparatus which measures a three-dimensional shape of an object, and includes: a mirror which reflects light from the object; an image capturing unit which captures a captured image including both a real image and a virtual image of the object, the virtual image being formed using the mirror; a light amount changing unit which changes a light amount of one of the real image and the virtual image; an image separating unit which specifies, as the one of the real image and the virtual image, a portion included in a first captured image and a second captured image and having a light amount different between the first captured image and the second captured image, the first captured image being influenced by the change caused by the light amount changing unit and the second captured image being uninfluenced, and which specifies, as the other of the real image and the virtual image, a portion included in the first captured image and the second captured image and having the same light amount; and a reconstruction unit which reconstructs the three-dimensional shape of the object, using the real image and the virtual image that are specified by the image separating unit.

In this manner, for example, it is not necessary to perform, in the light-section method, slit-beam irradiation or capturing of a positional relationship between slit beams on the object using cameras. With this, complicated processing is no longer necessary, and it is possible to reconstruct the three-dimensional shape easily. Moreover, since it is possible to reduce an amount of time between the capturing of the two captured images as compared to the processing time for capturing the positional relationship using cameras, it is possible to perform the image capturing in a short time even when the object is moving. With this, it is possible to reconstruct a three-dimensional shape of such a moving object. Accordingly, it is possible to perform reconstruction with simple processing, and further to perform reconstruction even when the object is moving.

Note that the three-dimensional shape measuring apparatus may include a plurality of capturing units. One or more of such a plurality of capturing units may capture a captured image which includes either a real image or a virtual image. In addition, the image capturing unit may capture a captured image other than a captured image of which the real image and the virtual image are to be separated by the image separating unit. Here, such another captured image may be an image, for example, which includes either the real image or the virtual image or both the real image and the virtual image.

In addition, to "change a light amount of one of the real image and the virtual image" is to cause a predetermined change in the light amount of one of the images, and not to cause the predetermined change in the light amount of the other image. Here, the predetermined change is a change which is generated in one image and is not generated in the other image, thereby allowing the image separating unit to perform image separation. For example, in the other image, some change which is not a change that disables the image separation unit to perform the image separation (for example, the predetermined change described above) may be caused along with the change in the one image that is not the other image.

Advantageous Effects of Invention

With the three-dimensional shape measuring apparatus according to the present invention, it is possible to separate a real image of an object which can be captured by an image capturing unit and a virtual image of the object reflected in the mirror, when capturing images of the object by using the mirror. With this, for example, it is possible to use an image captured by a single image capturing unit as an image captured at an image capturing position different from positions at which the virtual and real images are actually captured in the real world. With this, it is possible to reduce the number of image capturing units used for the three-dimensional shape measurement, thus producing an advantageous effect of reducing the problem of camera calibration which becomes more complicated when more capturing units are used.

In addition, it is possible to separate the real and virtual images by simple processing, and also perform the measurement accurately even when the object is moving. This produces an advantageous effect of allowing three-dimensional reconstruction with simple processing, and thus further allowing the reconstruction even when the object is moving.

BRIEF DESCRIPTION OF DRAWINGS

FIG. 17 is a configuration diagram showing an outline of a three-dimensional shape measuring apparatus according to a third embodiment.

FIG. 18 is a configuration diagram showing an outline of a three-dimensional shape measuring apparatus according to the third embodiment.

DESCRIPTION OF EMBODIMENTS

Figure 1:
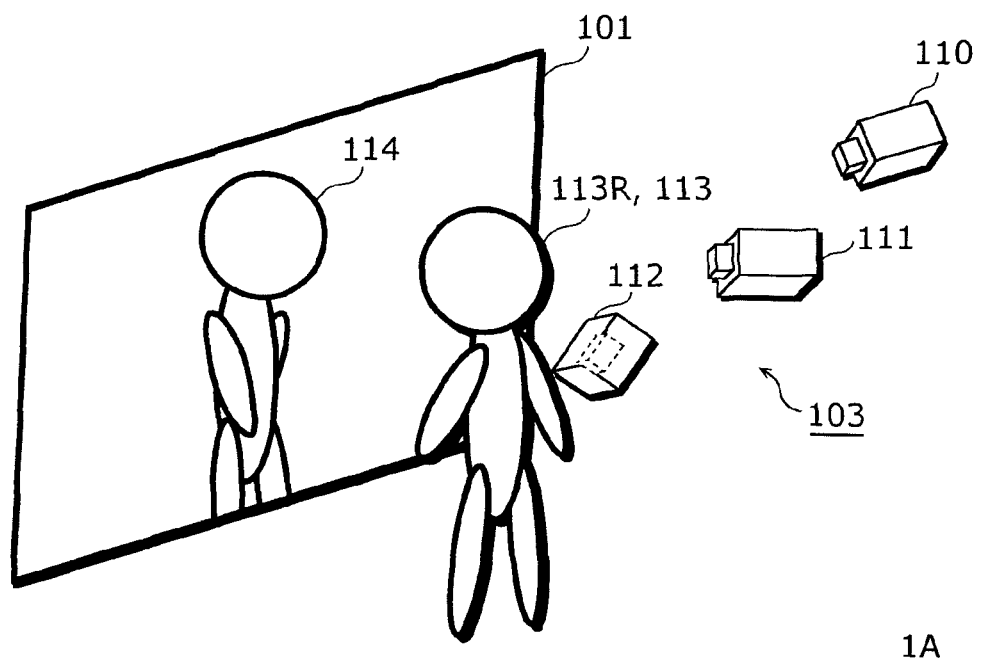
FIG. 1 is a configuration diagram showing an outline of a three-dimensional shape measuring apparatus according to a first embodiment.

Hereinafter, embodiments of the present invention will be described with reference to the drawings.

Note that in each of the drawings to be used hereafter, the same constituent element is appended with the same reference signs, and a description thereof is omitted.

The three-dimensional shape measuring apparatus according to an embodiment of the present invention (three-dimensional shape measuring apparatuses from 1 to 8) is a three dimensional shape measuring apparatus which measures a three-dimensional shape of an object (object 113R), and includes: a mirror (mirror 101, 150, and so on) which reflects light from the object; an image capturing unit (image capturing unit 103) which captures a captured image including both a real image and a virtual image of the object, the virtual image being formed using the mirror; a light amount changing unit (light amount changing unit 63a, display unit 120, mirror shielding unit 130, light irradiation unit 140, and so on) which changes a light amount of one of the real image and the virtual image; an image separating unit (captured image separating unit 104) which specifies, as the one (real image Ib2, real image 113, and so on) of the real image and the virtual image, a portion included in a first captured image (changed image Ia, and so on) and a second captured image (normal image Ib) and having a light amount different between the first captured image and the second captured image, the first captured image being influenced by the change caused by the light amount changing unit and the second captured image being uninfluenced, and which specifies, as the other (virtual image Ib1, virtual image 114, and so on) of the real image and the virtual image, a portion included in the first captured image and the second captured image and having the same light amount; and a reconstruction unit (three-dimensional reconstruction unit 107) which reconstructs the three-dimensional shape of the object, using the real image and the virtual image that are specified by the image separating unit.

Thus, the real image and the virtual image are specified out of the real image and the virtual image, respectively, based on the change in the light amount of one of the images. With this, the real and the virtual images are separated from each other. Thus, it is possible to separate the images quickly, with simple processing.

Note that to capture a captured image including both a real image and a virtual image is to capture a captured image including both a real image region and a virtual image region.

To change the light amount of one of the images is to change the amount of light by influencing the light in a light path of the light of one of the images (light path 101R).

To specify, as the one of the real image and the virtual image, a portion included in a first captured image and a second captured image and having a light amount different between the first captured image and the second captured image, the first captured image being influenced by the change caused by the light amount changing unit and the second captured image being uninfluenced, and to specify, as the other of the real image and the virtual image, a portion included in the first captured image and the second captured image and having a same light amount is to specify, as the region of the other image, a portion that is not influenced, that is, a portion of which the light amount is not changed, out of the entirety including both the real and virtual regions in the first captured image that is influenced. In addition, to specify, as the one of the real image and the virtual image, a portion having a different light amount is to specify, as the region of the one of the images, a portion which is other than the specified region of the other image in the entirety.

Note that specifying the region of the other image may be performed later or earlier than specifying the region of one of the images, or both may be performed at the same time.

To reconstruct the three-dimensional shape of the object, using the real image and the virtual image that are specified is to specify, as the three-dimensional shape of the object, a three-dimensional shape for capturing the region of the specified one of the images and the region of the other image in the first captured image.

For example, the image capturing unit captures a first captured image that is influenced (changed image Ia) and also captures a second captured image that is not influenced (normal image Ib). Then, the image separating unit determines, as the three-dimensional shape of the object, a three-dimensional shape for causing the image (virtual image Ib1), which is included in the region (virtual image region R1) in the specified one of the images, to be captured in the second captured image (normal image Ib) that is captured. With this, the three-dimensional shape is determined based on an image that is not changed, thus increasing accuracy in the specification.

Note that the light amount changing unit, for example, may change, into zero, the light amount of one of the two images in a region of the real image (real image region R2) and a region of the virtual image (virtual image region R1) which are included in the captured image (captured image I).

Note that, in other words, for example, in the three-dimensional shape measuring apparatus (three-dimensional shape measuring apparatus 1), the mirror (mirror 101) forms a virtual image of the object. Then, the image capturing unit (image capturing unit 103) captures a captured image including both the region of the real image (real image region R2) and the region of the virtual image (virtual image region R1). Then, the light amount changing unit (light amount changing unit 63a) changes the amount of light of one of the images by influencing the light in the light path in which the light of one of the virtual and real images travels (light path 101R). Then, of the real image region and the virtual image region as a whole, the image separating unit (captured image separating unit 104) specifies, as the region for the other image (real image) (real image region R2), a portion of which the light amount is not changed, and specifies, as a region for the one image (virtual image) (virtual region R1), a portion other than the region specified as the region for the other image. Then, the reconstruction unit specifies, as the three-dimensional shape of the object, a three-dimensional shape for capturing the two specified regions. The specified three-dimensional shape is, for example, displayed to a user.

With this, it is possible to separate the two images easily and quickly, by simply using the light amount of one of the images.

Moreover, no complicated configuration is required in which the image capturing apparatus and so on are set to a position, a direction, and so on such that the captured image includes only one region. In other words, the apparatus is configured according to a simple configuration which includes an image capturing apparatus having a position, direction, and so on that allow capturing of an image including both regions. With this, it is possible to simplify the configuration of the apparatus.

Note that the light amount changing unit may change, for example, only the light amount in a particular color of the one of the images. In addition, the light amount changing unit may uniformly change, for example, light amount in each color within a predetermined range. Note that the light amount changing unit may be realized in an embodiment other than these embodiments.

In addition, the image separating unit may cause the image capturing unit to capture the first captured image having a first light amount resulting from changing the light amount by the light changing unit, and may also cause the image capturing unit to capture the second captured image having a second light amount resulting from not changing the light amount, so as to obtain the two captured images, and may specify the real image and the virtual image by using the two captured images thus obtained, respectively.

Note that the three-dimensional shape measuring apparatus may include a synchronization unit which: causes the light amount to change in synchronization with the timing with which the first captured image is captured, that is, causing the light amount to change concurrently with the first capturing; and causes the light amount not to change in synchronization with the timing with which the second captured image is captured, that is, not causing the change concurrently with the second capturing.

The reconstruction unit, for example, calculates a three-dimensional shape for generating the real and virtual images, using the real image and the virtual image, and specifies the calculated three-dimensional shape as the three-dimensional shape of the object. That is, the reconstruction unit calculates respective three-dimensional positions included in the three-dimensional shape, to thereby calculate the three-dimensional shape including the respective three dimensional positions that have been calculated. For example, the reconstruction unit may reconstruct the three-dimensional shape according to the same method for recognizing a three-dimensional shape as stereo viewing by which a person recognizes a three-dimensional shape from a plurality of images.

Note that the three-dimensional shape measuring apparatus may also be configured as below.

Specifically, the three-dimensional shape measuring apparatus may have a configuration which includes: a mirror portion which reflects light, an image capturing unit which captures an image in which the object and the mirror portion are reflected, and a light amount control unit (light amount changing unit), and may change, in synchronization with the image capturing, an appearance of the virtual image reflected in the mirror as seen from the image capturing unit.

With this configuration, it is possible to provide a change to the image in the virtual image portion in the image captured in the image capturing performed several times, and to obtain an image that is a combination of the real image of the object that can be directly captured and the virtual image of the object, and an image that is a combination of the real image and the virtual image that is provided with change by the light amount control unit. Furthermore, by adding the three-dimensional reconstruction unit (reconstruction unit) to the configuration, it is possible to extract only the real image portion and the virtual image portion of the object from the two types of the images, and to perform three-dimensional reconstruction using such extraction results.

Then, in the three-dimensional shape measuring apparatus, a captured image separating unit (image separating unit) is used when the real image and the virtual image are separately used for performing the three-dimensional reconstruction. This (captured image separating unit) extracts the real image and the virtual image separately by image processing, using a difference between the image that is a combination of the real and virtual images obtained in the image capturing performed several times, and the image that is a combination of the real image and the virtual image that is changed.

Furthermore, in this three-dimensional shape measuring apparatus, the virtual image portion reflected in the mirror portion is horizontally reversed due to properties of mirror reflection. Thus, when using the virtual image separated by the captured image separating unit for three-dimensional reconstruction, the three-dimensional shape measuring apparatus horizontally reverses the virtual image, using the virtual image reversing unit.

Here, in the three-dimensional shape measuring apparatus, when using the real and virtual images for three-dimensional reconstruction, these two images are available as images captured from different viewpoints. That is, for example, when the three-dimensional shape measuring apparatus has a flat mirror, it is possible to consider using the position of the image capturing unit as a viewpoint for the real image while on the other hand using a position facing the mirror portion and plane-symmetrical with respect to the position of the image capturing unit is used as a viewpoint for the virtual image.

Note that the display unit that displays the image transmitted through the mirror in synchronization with the image capturing can be considered as an example of the light amount control unit. The three-dimensional shape measuring apparatus causes the display unit to display an image having a predetermined color or a predetermined pattern by superposing the reflection in the mirror, thereby giving change to the captured image in the virtual image portion. Regarding the predetermined color or the predetermined pattern used for the image displayed by the display image, specifically, it is possible to consider using a color that is not used for the image captured when the display unit does not display an image, or a complementary color of the color of the object.

Note that it is preferable that the display unit display a color that is not the color of a portion other than the image portion in the captured image. Specifically, the color that is not the color of the other portion may also be, for example, a color that is not used for the image capturing performed by the image capturing unit when the display unit does not display an image, and may also be a complementary color of the color of the object.

In addition, with the three-dimensional shape measuring apparatus including such a display unit, it is possible to display, in the display unit, the three-dimensional shape reconstructed using the display unit, and also to compare the displayed image with the virtual image of the object reflected in the mirror.

Furthermore, as a method for giving change to the virtual image portion of the captured image, it is possible to consider a technique of blocking the reflected light from the mirror portion, using a physical unit such as a shutter, for example, or a technique of changing the reflected light amount by irradiating the mirror with a beam.

In addition, the three-dimensional shape measuring apparatus may also have a configuration as below.

Specifically, the three-dimensional shape reconstructing apparatus (three-dimensional shape measuring apparatus) includes the display unit, the mirror, and the image capturing unit, and causes the image capturing unit to capture the real image of the object which can be directly captured from the image capturing unit and the virtual image of the object which is reflected in the mirror. With this, it is possible to perform capturing of the object from two view points using a single capturing unit. Then, in order to use this technique, the three-dimensional shape reconstructing apparatus causes the display control unit to display or delete the image in the display unit in synchronization with the image capturing. Then, the three-dimensional shape reconstructing apparatus causes an extraction unit to extract the real image and the virtual image by image processing, respectively, based on a result of the image capturing. Here, in order to perform the three-dimensional reconstruction according to the conventional method, it is better to increase the number of cameras so as to reduce the number of blind spots, but this causes a dilemma that it becomes more difficult to perform calibration when more cameras are used. Whereas, in the three-dimensional shape measuring apparatus according to the present invention, it is possible to reduce the number of cameras to a minimum to solve this problem when introducing, for home use, a system which performs three-dimensional reconstruction of an object. The three-dimensional shape measuring apparatus may have the configuration described above.

Embodiment 1

FIG. 1 is a configuration diagram showing an outline of a three-dimensional shape measuring apparatus according to a first embodiment of the present invention.

As shown in FIG. 1, a three-dimensional shape measuring apparatus 1 includes: a mirror 101, an image capturing unit 103 including image capturing apparatuses 110 to 112, and a control unit 1A.

Note that an object 113R is an object whose three-dimensional shape is measured by the three-dimensional shape measuring apparatus 1. For example, the object 113R is a user whose three-dimensional shape is measured by the three-dimensional shape measuring apparatus 1. In addition, a virtual image 114 is another virtual image which is a reflection of the object 113R reflected in the mirror 101 and appears separately from a real image 113 of the object 113R. That is, the virtual image 114 is an image of the object 113R, and is formed with light proceeding from the object 113R and reflected by the mirror 101.

The control unit 1A (FIG. 1) is a control unit which is connected to respective units, such as the image capturing unit 103, included in the three-dimensional shape measuring apparatus 1, and controls the operation of each unit in the three-dimensional shape measuring apparatus 1.

Note that the control unit 1A is, for example, a computer including CPU1Aa (a processor), ROM1Ab, and RAM1Ac. Then, the control unit 1A realizes each function described in this specification by, for example, causing CPU1Aa to execute a computer program stored on the ROM1Ab. The control unit 1A, for example, causes CPU1Aa to realize each function. In other words, for example, in the control unit 1A, CPU1Aa performs each function. In addition, CPU1Aa may also perform only a part of the processing, and the control unit 1A may further include a dedicated processor which performs the rest of the processing. Note that it goes without saying that the control unit 1A may be realized in an embodiment other than the embodiment described above.

Figure 2:
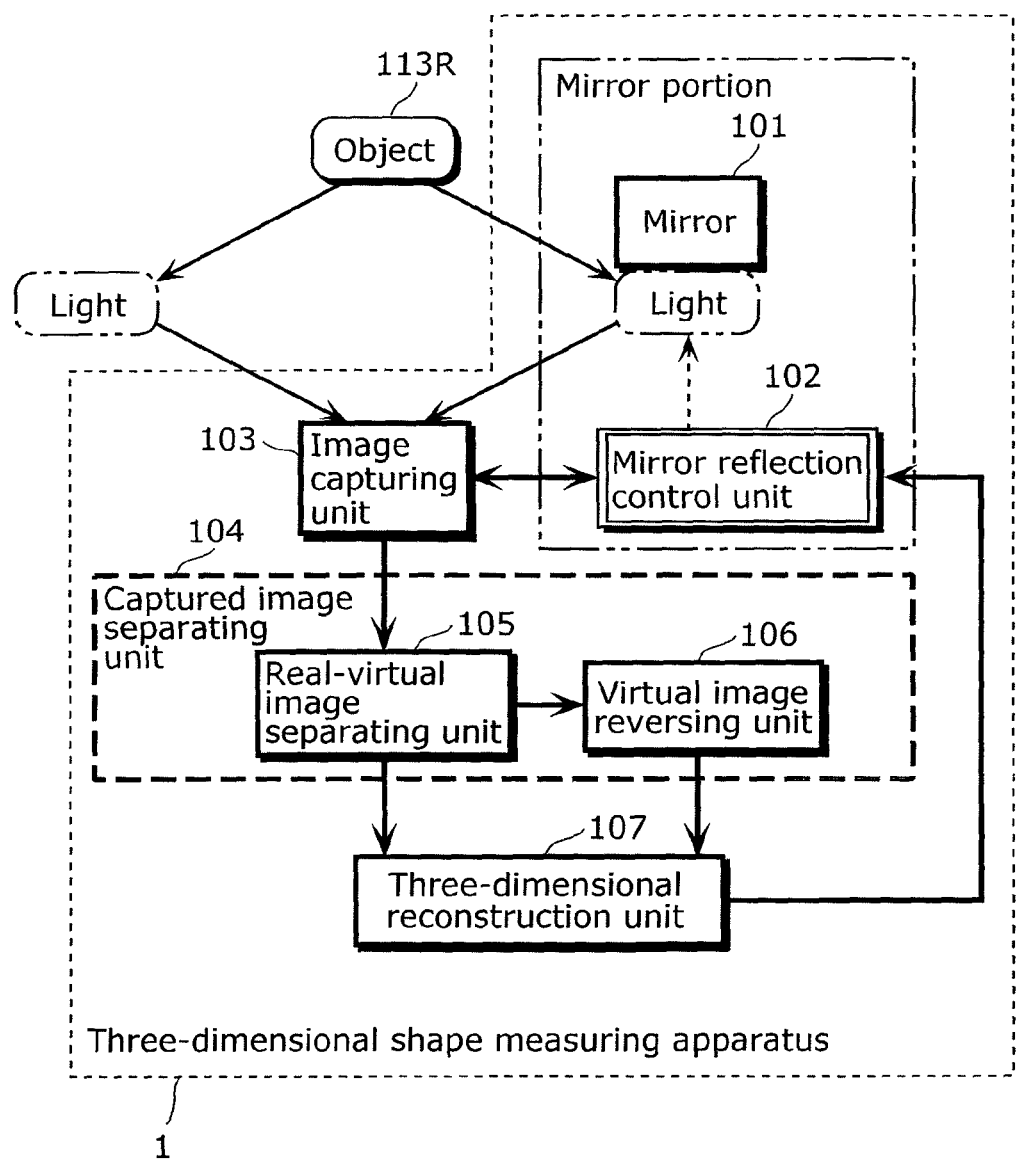
FIG. 2 is a basic configuration diagram showing each portion in a configuration according to the first embodiment and a processing flow when three-dimensional reconstruction is performed according to the first embodiment.

FIG. 2 is a block diagram showing each portion in a configuration according to the present invention and a processing flow when three-dimensional reconstruction is performed according to the present invention.

The three-dimensional shape measuring apparatus 1 further includes a captured image separating unit 104, a three-dimensional reconstruction unit 107, and a mirror reflection control unit 102, in addition to the mirror 101 and the image capturing unit 103.

The control unit 1A (FIG. 1) realizes, as a function block for the function to be realized in the control unit 1A, each of the captured image separating unit 104, the three-dimensional reconstruction unit 107, and the mirror reflection control unit 102, by executing software or using hardware.

Figure 3:
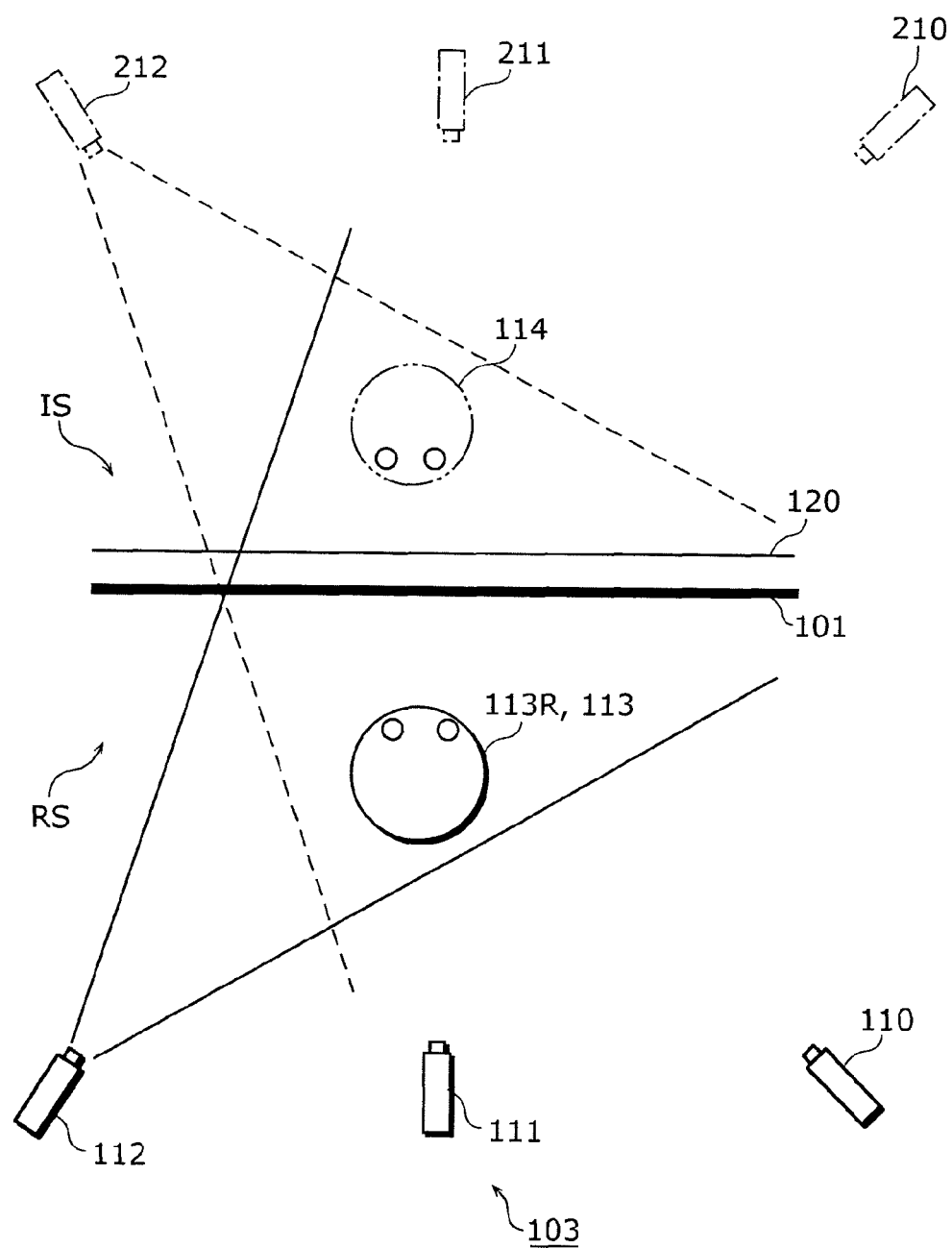
FIG. 3 is a diagram showing a positional relationship between constituent elements according to the first embodiment.

FIG. 3 is a diagram showing a positional relationship between: the mirror 101, the display unit 120 (see FIG. 2), the image capturing apparatuses 110 to 112 (image capturing unit 103), the real image 113 of the object 113R (see FIG. 1), and the virtual image 114 corresponding to the real image 113 (see FIG. 1).

The mirror 101 (FIGS. 1 to 3) reflects the light from the object 113R, so that the virtual image 114 which is a reflection of the object 113R in the mirror 101 is formed with the reflected light. Here, the mirror 101 is a mirror having a function to both reflect and transmit the light. The mirror 101 transmits, to the surface side, at least part of the light which proceeds toward the mirror 101 from a side (at which the display unit 120 is disposed) of a reverse face of the mirror 101 with respect to the position of the object 113R (see FIG. 3), that is, transmits the part of the light toward the surface side at which the object 113R and the image capturing apparatuses 110 to 112 are located.

Note that a real space RS is a space indicated by direct light from the object 113R or the like, that is, a real space. In addition, an imaginary space IS is a space indicated by the light reflected from the mirror 101. The real image 113 is an image which appears in the real space RS. The virtual image 114 is an image which appears in the imaginary space IS.

The image capturing unit 103 (FIGS. 1 to 3) includes the image capturing apparatuses 110 to 112.

The image capturing apparatuses 110 to 112 obtain an image in which one or both of the real image 113 of the object 113R and the virtual image 114 reflected in the mirror 101 are captured. Each of the image capturing apparatuses 110 and so on captures the real image 113 and the virtual image 114 of the object 113R simultaneously, using a single image capturing apparatus. With this, each image capturing apparatus also obtains, as the virtual image 114 reflected in the mirror 101, an image as seen from a mirror side 101 of the object 113R, which is originally a blind position to the image capturing apparatus at its image capturing position.

Note that for the sake of convenience in description, the case will be described where each of the image capturing apparatuses 110 to 112 captures an image including both the real image 113 and the virtual image 114 of the object 113R, and where an image capturing apparatus which captures only one of the images is not included. The case where the image capturing apparatus capturing only one of the images is included will be described later as a variation.

Then, the image capturing unit 103 causes the image capturing apparatuses 110 and 112 to capture an image of the object 113R at the same time, so as to obtain three different images at the same time. Note that the image capturing unit 103 may cause the image capturing apparatuses 110 to 112 to perform the image capturing within a sufficiently short and appropriate time range. For example, the three-dimensional shape measuring apparatus 1 may include an image capturing timing control unit which causes the image capturing apparatuses 110 to 112 to perform image capturing at the same time, and such an image capturing timing control unit may be included in the image capturing unit 103. In addition, such an image capturing timing control unit may be included in a unit other than the image capturing unit 103, for example, a real-virtual image separating unit 105.

Figure 4:
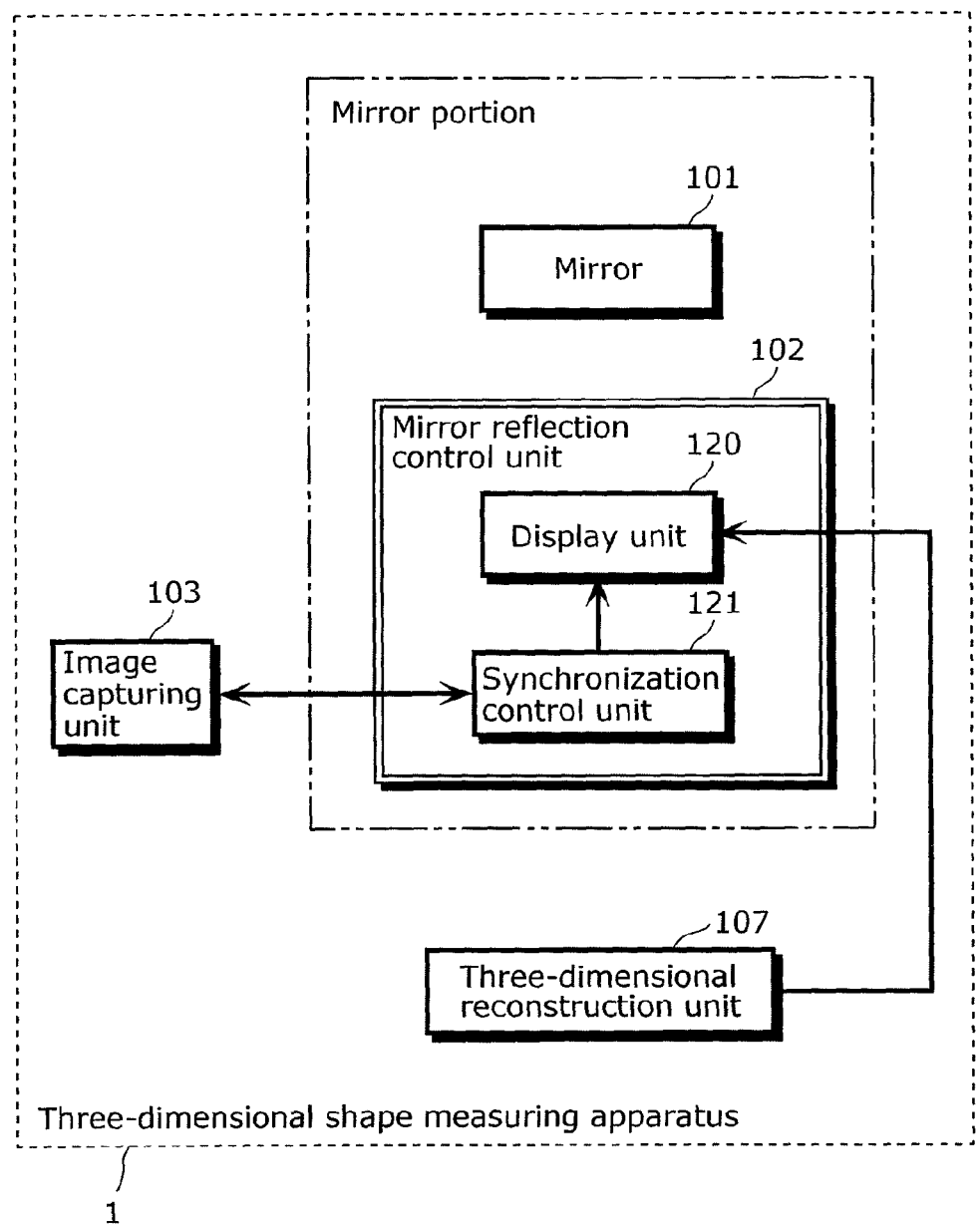
FIG. 4 is a specific configuration diagram of a mirror and a mirror reflection control unit according to the first embodiment.

FIG. 4 is a block diagram showing a detailed configuration of the mirror reflection control unit 102 (FIG. 2).

The mirror reflection control unit 102 includes the display unit 120 (see FIG. 3) and a synchronization control unit 121 (FIG. 4).

The display unit 120 (FIGS. 3 and 4) is provided in the back of the mirror, that is, at a side of a reverse face of the mirror 101, and includes a function to display a predetermined image. Since the mirror 101 provided in front of the display unit 120 transmits, as described earlier, the light from the display unit 120 provided at the reverse face side, the light of the image to be displayed is caused to appear at the front side of the mirror by the display unit 120 displaying the image. With this, the display unit 120 changes the color of the image reflected in the mirror 101.

Note that the display unit 120 may display any image in a predetermined color, a predetermined pattern, or the like as long as the image influences the appearance of the virtual image 114 of the object 113R reflected in the mirror 101, such as a given color or a pattern. For example, the image may also be displayed using a color that does not appear in the image captured in a state where the display unit 120 does not display an image, or a complementary color of a color included in the object 113R. This facilitates separation of the real image 113 and the virtual image 114, thus producing an ideal effect.

Figure 5:
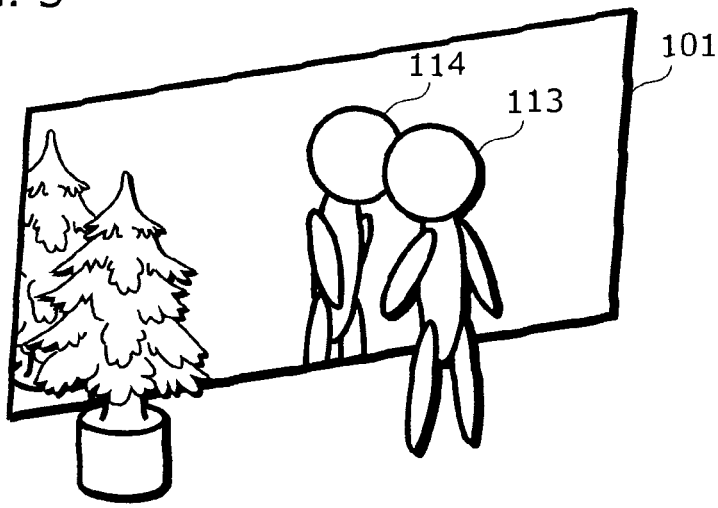
FIG. 5 is a diagram showing a captured image of a state where no image is displayed.
Figure 6:
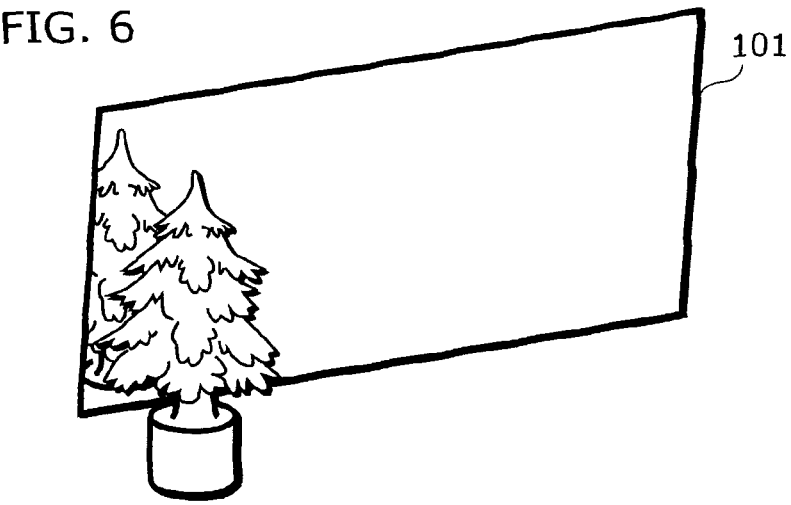
FIG. 6 is a diagram showing a captured image of a state where no image is displayed.
Figure 7:
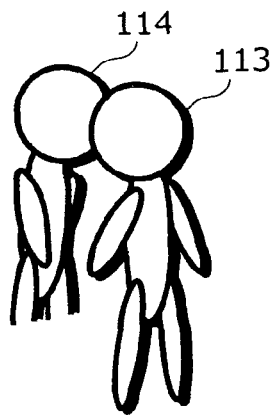
FIG. 7 is a diagram showing a captured image of a state where no image is displayed.

FIGS. 5 to 7 are diagrams for describing contents of the processing performed by the three-dimensional shape measuring apparatus 1 on the image captured when the display unit 120 does not display an image.

Figure 8:
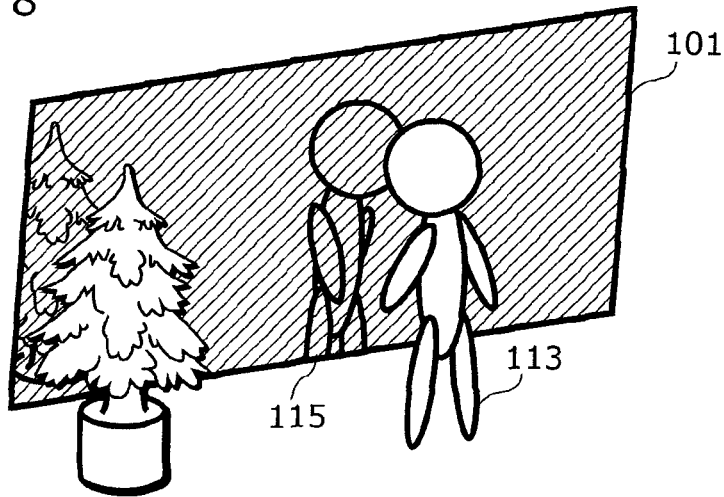
FIG. 8 is a diagram showing a captured image of a state where an image is displayed.
Figure 9:
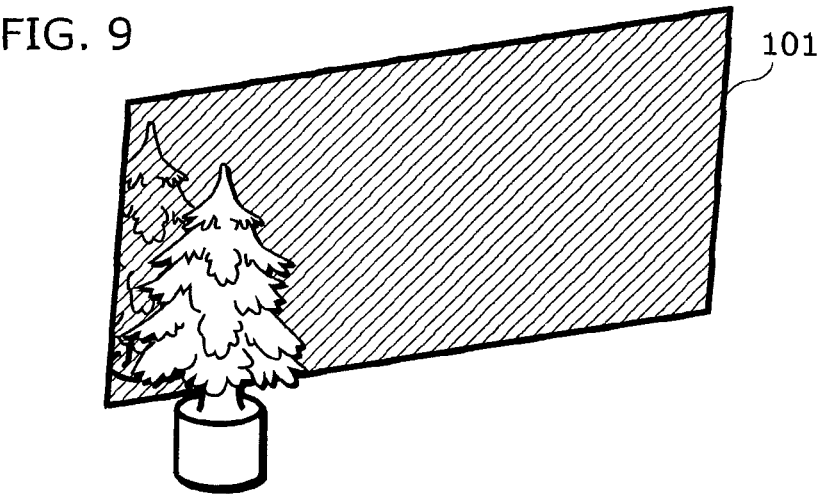
FIG. 9 is a diagram showing a captured image of a state where an image is displayed.
Figure 10:
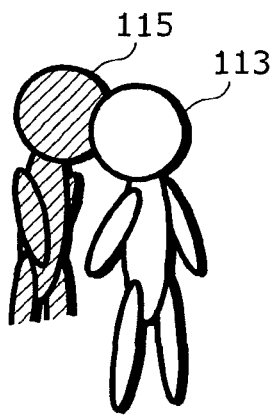
FIG. 10 is a diagram showing a captured image of a state where an image is displayed.

FIGS. 8 to 10 are diagrams for describing contents of the processing performed by the three-dimensional shape measuring apparatus 1 on the image captured when the display unit 120 displays an image.

FIG. 5 is a diagram showing an image captured when the image is not displayed. In addition, FIG. 8 is a diagram showing an image captured when the image is displayed. For example, each of these captured images is captured by the image capturing apparatus 110.

The image captured when the image is displayed (FIG. 8) includes a region illustrated by hatching, in which the light of the image which has been transmitted through the mirror 101 and then displayed by the display unit 120 appears. Then, the virtual image 115 in the captured image is included in the region in which such transmitted light appears.

On the other hand, the image captured when the image is not displayed (FIG. 5) has no such hatched region because no image is displayed; that is, there is no region in which the transmitted light appears.

Note that the display unit 120 changes the light amount of the virtual image from the light amount of the virtual image 114 (FIGS. 5 to 7) captured when no image is displayed to the light amount of the virtual image 115 (FIGS. 8 to 10) captured when the image is displayed.

Note that the display unit 120 may change density of the virtual image 114 by simultaneously changing the light amount of each color in the virtual image 115 by displaying a white image or the like. In addition, the display unit 120 may change the light amount of a particular color in the virtual image 114 by displaying an image in the particular color such as blue.

The synchronization control unit 121 (FIG. 4) has a function to switch the display in the display unit 120 in synchronization with the image capturing performed by the image capturing unit 103. The synchronization control unit 121 switches, in synchronization with the image capturing performed by the image capturing unit, between the states where the display unit 120 displays nothing and where the display unit displays an image as shown by the image in FIG. 8, and causes each image capturing apparatus to perform image capturing in each of the states.

That is, the synchronization control unit 121 detects, for example, timing with which to perform the image capturing. Then, when detecting the timing without an input of a predetermined display instruction signal, the synchronization control unit 121 causes, concurrently with the detection, each of the capturing apparatuses 110 and so on to perform image capturing in a state where no image is displayed (the state shown in FIG. 5), by causing the display unit 120 not to display an image. On the other hand, upon detecting an input of the display instruction signal, the synchronization control unit 121 causes the image to be displayed concurrently with the timing of the detection, and causes the image capturing to be performed in a state where an image is displayed (the state shown in FIG. 6).

Note that the synchronization control unit 121 may also be a function block realized by the control unit 1A (FIG. 1).

The captured image separating unit 104 (FIG. 2) includes the real-virtual image separating unit 105 and a virtual image reversing unit 106.

The real-virtual image separating unit 105 separates the real image 113 and the virtual image 114 from each of the images that is captured by the image capturing apparatuses 110 to 112 and that includes both the real image 113 and the virtual image 114. That is, the real-virtual image separating unit 105 specifies each of the real image 113 and the virtual image 114 that are included in each of the images. That is, the real-virtual image separating unit 105 obtains an image captured by each of the three image capturing apparatuses, and specifies each of the real image 113 and the virtual image 114 that are included in each of the obtained images.

Figure 11:
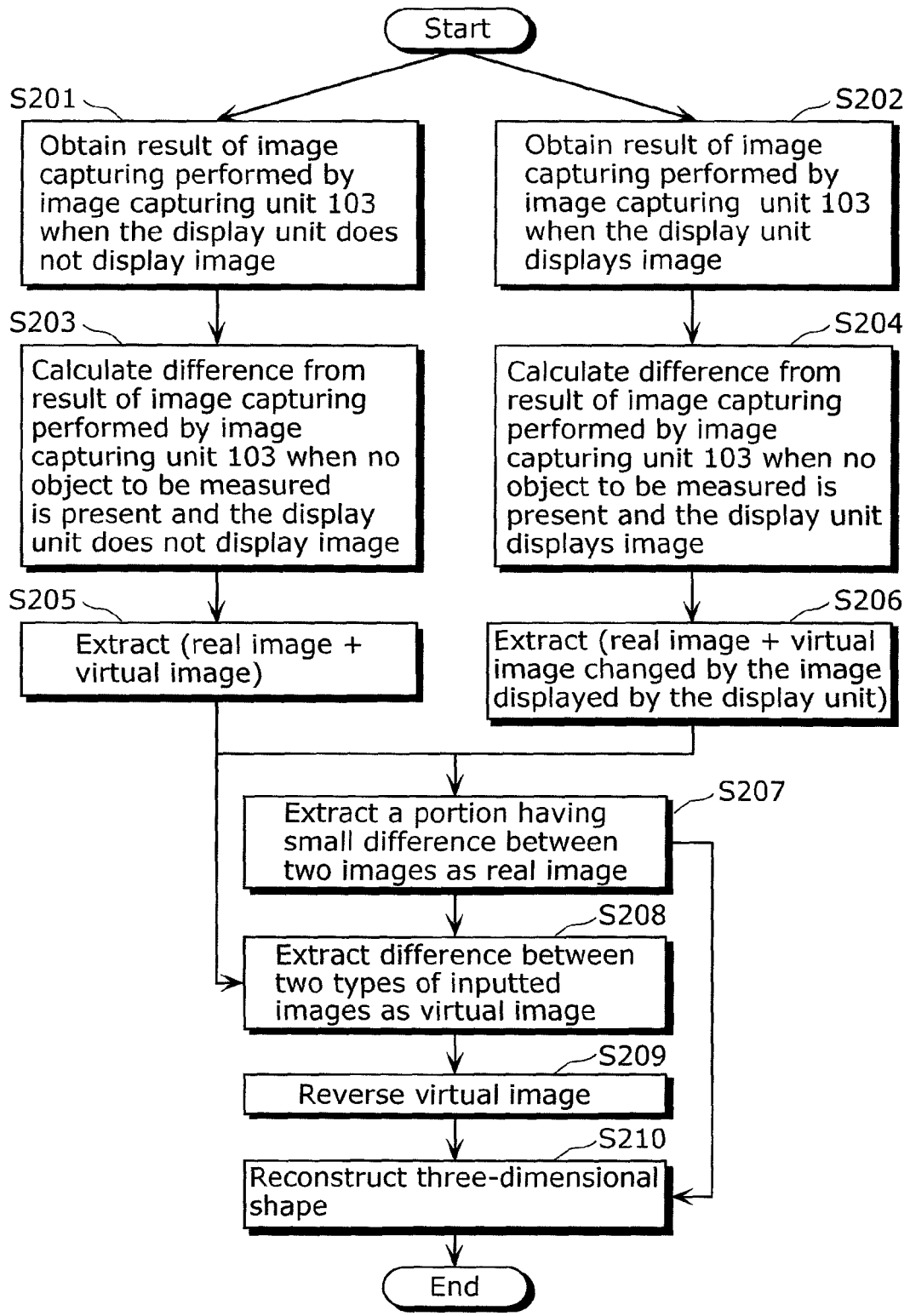
FIG. 11 is a diagram showing a processing flow of extracting a real image portion and a virtual image portion by image processing according to the first embodiment.

FIG. 11 is a diagram showing a processing flow of extraction of the real image portion and the virtual image portion performed by the image processing described above. The processing flow of the extraction is shown in FIG. 11.

Of the processing shown in FIG. 11, the real-virtual image separating unit 105 performs the above-described processing for separating the real image 113 and the virtual image 114 by the processing in Steps S201, S202, S203, S204, S205, S206, S207, and S208.

Note that the real-virtual image separating unit 105 performs the same processing on the image captured by each of the three image capturing apparatuses in each of the above Steps S201 and so on. For the sake of convenience in description, the following will detail only the processing performed by the real-virtual image separating unit 105 on the image captured by the image capturing apparatus 110.

In Step S201, the real-virtual image separating unit 105 obtains the image (FIG. 5) captured when the display image 120 (FIGS. 3 and 4) does not display an image, by causing, for example, the image capturing unit 103 to perform image capturing instead of causing the synchronization control unit 121 to obtain the display instruction signal.

FIG. 6 is a diagram showing an image captured by the image capturing apparatus 110 in a state where the object 113R is not present and no image is displayed.

Here, the real-virtual image separating unit 105 holds, for example, the image shown in FIG. 6. Note that the real-virtual image separating unit 105 may hold such an image as shown in FIG. 6, which is previously captured by the image capturing apparatus 110.

Next, FIG. 7 is a diagram showing, from the image shown in FIG. 5, only the real image 113 and the virtual image 114 of the object 113R.

In Step S203, the real-virtual image separating unit 105 calculates a difference between the image captured by the image capturing apparatus 110 in a state where the object 113R is present and the held image shown in FIG. 6. Here, to obtain the difference is to calculate a difference image.

With this, in Step S205, the real-virtual image separating unit 105 extracts, from the image obtained in Step S201, as shown in FIG. 7, an extracted image which includes only the real image 113 and the virtual image 114 and from which the other parts are removed. That is, the real-virtual image separating unit 105 obtains (calculates) the extracted image by calculating the difference.

FIG. 8, as described earlier, is an image captured when an image is displayed and the object 113R is present.

In Step S202, the real-virtual image separating unit 105 obtains the image (FIG. 8) captured when the display unit 120 (FIGS. 3 and 4) displays an image, by causing the image capturing unit 103 to perform the image capturing while concurrently causing, for example, the synchronization control unit 121 to obtain the display instruction signal.

Note that the real-virtual image separating unit 105 causes this image capturing in Steps S202 and the image capturing in S201 as described above to be performed, for example, within a sufficiently short time when the object 113R is not moving. Thus, each of the two images shown in FIGS. 5 and 6 is captured within a sufficiently short period of time and thus having no change in the position and direction of the object 113R.

FIG. 9 shows a captured image when an image is displayed and the object 113R is not present.

Here, the real-virtual image separating unit 105 holds, for example, an image as shown in FIG. 9. Note that the real-virtual image separating unit 105 may hold the image as shown in FIG. 9, which is previously captured by the image capturing apparatus 110.

FIG. 10 shows a result of extraction of only the real image 113 and the virtual image 115 of the object 113R.

In Step S204, the real-virtual image separating unit 105 calculates a difference between the image shown in FIG. 8 which is obtained in Step S202 and the held image shown in FIG. 9.

With this, in Step S206, the real-virtual image separating unit 105 extracts, from the image obtained in Step S202, as shown in FIG. 10, an extracted image which includes only the real image 113 and the virtual image 115 and from which the other parts are removed, that is, obtains (calculates) the extracted image by calculating the difference.

Thus, the real-virtual image separating unit 105 calculates, by the processing in Steps S201, S203, and S205, a difference between the image captured in a state where the display image 120 does not display an image (FIG. 5) and the image captured when no object is present (FIG. 6), to thereby extract (calculate) a combination of the real image 113 and the virtual image 114 (the extracted image shown in FIG. 7) from these two captured images by image processing.

In addition, the real-virtual image separating unit 105 further calculates, by the processing in Steps S202, S204, and S206, a difference between the image captured when the object 113R is present (FIG. 8) and the image captured when the object 113R is not present (FIG. 9) in a state where the display image 120 displays an image, to thereby extract a combination of the real image 113 and the virtual image 115 of the object 113R (the extracted image shown in FIG. 10) from these two captured images.

Then, the real-virtual image separating unit 105 further compares the two extraction results (extracted images) as shown in FIGS. 7 and 10.

The virtual image 115 reflected in the mirror 101 in the state where the display unit 120 displays an image (FIGS. 8 to 10) is different from the virtual image 114 reflected in the mirror 101 in the state where the display unit 120 does not display an image (FIGS. 5 to 7). This difference is used by the real-virtual image separating unit 105.

In Step S207, the real-virtual image separating unit 105 extracts, as the real image 113, a portion having a small difference between the extracted image in FIG. 7 and the extracted image in FIG. 10. In other words, in Step S207, the real-virtual image separating unit 105 specifies as the real image 113, and extracts from the two extracted images, a portion which has, for example, a difference smaller than a predetermined threshold such as a difference value resulting from a smallest change among changes caused by the image display.

For example, in Step S207, the real-virtual image separating unit 105 specifies the above portion having the smallest difference in a predetermined one of the extracted images in FIG. 7 and FIG. 10 (for example, a portion corresponding to the real image 113 in FIG. 7), and determines the specified portion as the real image 113 of the object 113R.

In addition, in Step S208, the real-virtual image separating unit 105 extracts, as the virtual image 114, a portion which is included in the extracted image in FIG. 7 and is other than the real image 113 extracted earlier in Step S207.

Note that the real-virtual image separating unit 105 may extract the real image 113 of the object 113R by comparing the difference image (FIG. 7) between FIG. 5 and FIG. 6, and the difference image (FIG. 10) between FIG. 8 and FIG. 9, and may extract a portion other than the real image 113 in FIG. 7 as the virtual image 114.

Here, the real image 113 extracted in Step S207 and the virtual image 114 extracted in Step S208 are described in detail.

As shown in FIG. 3, the three-dimensional shape measuring apparatus 1 can use the virtual image 114 as an image of the object 113R which is captured by the virtual image capturing apparatus (for example, a virtual image capturing apparatus 210 shown in FIG. 3) when virtually installing, by considering the position of the image capturing apparatus which has captured the virtual image 114 (for example, the image capturing apparatus 110), an image capturing apparatus other than the image capturing apparatus actually performing the image capturing at a position plane-symmetrical to the position of the image capturing apparatus which has performed the image capturing, with respect to the mirror 101 in which the virtual image 114 is reflected.

The figure shows the virtual image capturing apparatus in which the virtual image capturing apparatus 210 (FIG. 3), a virtual image capturing apparatus 211 (FIG. 3), and a virtual image capturing apparatus 212 (FIG. 3) correspond to the real image capturing apparatuses 110, 111, and 112, respectively. These virtual image capturing apparatuses 210 and so on are illustrated so as to describe the processing performed by the three-dimensional shape measuring apparatus 1 on the virtual image 114 extracted by each corresponding one of the image capturing apparatuses. These virtual image capturing apparatuses 210 and so on are merely virtual and are not included in the three-dimensional shape measuring apparatus 1, and thus they are not real.

Thus, each of the image capturing apparatuses obtains, by performing image capturing singly and only once, both the real image directly captured from the actual position of the image capturing apparatus, and an image obtained when a virtual image is captured by a virtual image capturing apparatus corresponding to the image capturing apparatus. In other words, each of the image capturing apparatuses can obtain two images captured at the positions of these two image capturing apparatuses.

However, as compared to the image actually captured at the position of the virtual image capturing apparatus, the virtual image 114 is horizontally reversed due to mirror properties.

The virtual image 114 extracted in Step S208 is horizontally reversed as described above.

The virtual image reversing unit 106 (FIG. 2) horizontally reverses the image in the virtual image portion (virtual image 114) extracted by the real-virtual image separating unit 105 in the manner described above. A virtual image 114 which is reversed by the virtual image reversing unit 106 is identical to the image of the object 113R which is actually captured at the position of the virtual image capturing apparatus.

In Step S209, the virtual image reversing unit 106 performs such reversal processing on each virtual image 114 extracted in Step S208.

The three-dimensional reconstruction unit 107 (FIG. 2) reconstructs the three-dimensional shape of the object 113R, using three real images 113 extracted by the real-virtual image separating unit 105, and three virtual images 114 extracted and then reversed by the virtual image reversing unit. That is, the three-dimensional reconstruction unit 107 performs processing for specifying a three-dimensional position of each portion in the object 113R and a color of the object 113R at the three-dimensional position.

More specifically, the three-dimensional reconstruction unit 107 reconstructs the three-dimensional shape of the object 113R, using, for example, the six images of the object 113R, the positions of the image capturing apparatuses 112 and so on (see FIG. 3), and the positions of the virtual image capturing apparatuses 210 and so on which have been described above.

Then, by displaying the result of this three-dimensional reconstruction in the display unit 120, the three-dimensional reconstruction unit 107 allows the user to see the result of measurement of the object 113R, that is, the result of the three-dimensional shape measurement of the user. With this, the user can compare the virtual image 114 of the object 113R (user) reflected in the mirror 101 (see FIGS. 3, and 5 to 7) and the result of the measurement that is displayed. That is, the user can compare the virtual image 114 that is visually recognized and the result of the measurement.

Note that the three-dimensional reconstruction unit 107 may also perform the three-dimensional reconstruction based on the six images and the six image capturing positions described above, using, for example, a known technique.

In addition, the three-dimensional reconstruction unit 107 may perform three-dimensional reconstruction in the following manner. Note that the following method is a mere example, and it goes without saying that a method other than the following method may be adapted.

Specifically, the three-dimensional reconstruction unit 107 specifies, in each of the six images described above, a portion in which the same region is captured. The three-dimensional reconstruction unit 107, for example, performs this specifying process using a matching technique, and specifies portions having a similar content among the six images as the portion in which the same region of the object 113R is captured.

Then, the three-dimensional reconstruction unit 107 specifies a direction of the specified region to be seen from each of the six image capturing positions. Then, the three-dimensional reconstruction unit 107 specifies a position at which lines extended into the specified direction from the six image capturing positions intersect each other, as the three-dimensional position of the region in the object 113R captured at each of the six image capturing positions.

Note that the three-dimensional reconstruction unit 107, for example, may specify a position at which the lines collect in the case where the lines do not intersect at one point, that is, may specify, as the three-dimensional position of the object 113R, a position at which a sum of distances from the respective lines is the smallest or a position at which a sum of the squares of the distances is the smallest.

Here, the three-dimensional reconstruction unit 107 specifies, for a portion included in the real image 113, the line from the image capturing position of the real image capturing apparatus 112 or the like which has captured the real image 113, and specifies, for a portion included in the virtual image 114, the line from the image capturing position of the virtual image capturing apparatus 210 or the like corresponding to the real image capturing apparatus 112 or the like which has captured the virtual image 114.

Note that the three-dimensional reconstruction unit 107 may hold six image capturing positions and specify the line by using each of the six image capturing positions that are held.

Note that the three-dimensional reconstruction unit 107 may specify the three-dimensional position of at least part of the regions, using only part of the six images.

In the manner described above, the three-dimensional reconstruction unit 107 specifies the three-dimensional position of each region in the object 113R.

Then, the three-dimensional reconstruction unit 107 specifies the color of each region by specifying the color of the region at the specified three-dimensional position as, for example, one of the colors of the respective regions in the six images whose three-dimensional positions are calculated.

In this manner, the three-dimensional reconstruction unit 107 specifies the three-dimensional position of each region and the color of the region at the three-dimensional position.

Here, the three-dimensional shape measuring apparatus 1 according to a variation will be described. In the three-dimensional shape measuring apparatus 1 according to the variation, part of the image capturing apparatuses, that is, either the image capturing apparatuses 110 to 112 captures an image which includes only one of the real image 113 and the virtual image 114 of the object 113R, for example, only the real image 113, instead of capturing an image which includes both the real image 113 and the virtual images 114 of the object 113R. In the three-dimensional shape measuring apparatus 1 thus configured according to the variation, for example, the three-dimensional reconstruction unit 107 may also construct a three-dimensional shape, using five or less images of the object 113R.

Thus configured is the three-dimensional shape measuring apparatus (three-dimensional shape measuring apparatuses 1) which measures a three-dimensional shape of an object 113R, and includes: a mirror portion (mirror 101) which reflects light from the object; an image capturing unit (image capturing unit 103) which captures a captured image including both a real image (real image 113) of the object and the mirror; a light amount changing unit (display unit 120) which changes a light amount of one of the real image and the virtual image (virtual image 114) that is formed using the mirror portion; an image separating unit (real-virtual image separating unit 105) which specifies, as the one (virtual image 114) of the real image and the virtual image, a portion included in the captured image that is captured when the change is caused (the image shown in FIG. 8) and the captured image that is captured when the change is not caused (the image shown in FIG. 5) and having a light amount different between these captured images, and which specifies, as the other (real image 113) of the real image and the virtual image, a portion included in the captured images and having the same light amount; and a reconstruction unit (three-dimensional reconstruction unit 107) which reconstructs the three-dimensional shape of the object, using the real image and the virtual image that are specified by the image separating unit.

Note that here the light amount changing unit (display unit 120) changes the light amount of one (virtual image 114) of the images, from the light amount of the virtual image 114 in FIG. 5 to the light amount of the virtual image 115 in FIG. 8.

Here, the mirror portion transmits, to a side of a mirror surface which reflects the light from the object, light proceeding to the mirror portion from the side of the reverse face opposite to the mirror surface, and the light amount changing unit changes the light amount of the virtual image by changing the amount of the light transmitted to the side of the mirror surface through the mirror portion.

In addition, the light amount changing unit changes the light amount of the virtual image, and includes a reference image holding unit (real-virtual image separating unit 105) which holds a reference image (the image shown in FIG. 6) that is to be captured by the image capturing unit in the case where no object to be captured by the image capturing unit is present, and the image separating unit (real-virtual image separating unit 105) causes the image capturing unit to capture the first captured image (the image shown in FIG. 8) by causing the light amount changing unit to change the light amount, and also causes the image capturing unit to capture the second captured image (the image shown in FIG. 5) by causing the light amount changing unit not to change the light amount, and specifies, as the real image (real image 113), from the two captured images, a portion not included in the reference image that is held and having the same light amount, and specifies, as the virtual image (virtual image 114), from the two captured images, a portion which is included in the second captured image (the image shown in FIG. 5) that is not changed, which is not included in the reference image that is held (the image shown in FIG. 6), and which has a different light amount.

In addition, the mirror portion transmits, to a side of a mirror surface which reflects the light from the object, light proceeding to the mirror from a side of a reverse face opposite to the mirror surface, and the light amount changing unit includes a display unit (display unit 120) which is provided at the reverse face side of the mirror potion and changes the light amount of the virtual image by changing an amount of the light transmitted to the side of the mirror surface through the mirror (the light amount changing unit is the display unit).

Here, the display unit displays an image having a predetermined color or a predetermined pattern. Then, the predetermined color may also be a color that is not used for the image captured by the image capturing unit when the display unit does not display an image. In addition, the predetermined color may be a complementary color of the color of the object.

Then, this three-dimensional shape measuring apparatus includes a three-dimensional shape display control unit (three-dimensional reconstruction unit 107) which causes the display unit to display the three-dimensional shape reconstructed by the reconstruction unit.

In addition this three-dimensional shape measuring apparatus includes a reversing unit (virtual image reversing unit 106) which horizontally reverses the virtual image specified by the image separating unit.

In addition, the reconstruction unit uses, for the three-dimensional reconstruction, the real and the virtual images specified by the image separating unit as two images of the object that are captured from two different viewpoints.

Then, the viewpoint for the real image is the image capturing position of the image capturing unit, and the viewpoint for the virtual image is plane-symmetrical with respect to the mirror portion, in relation to the position of the image capturing unit.

Embodiment 2

Figure 12:
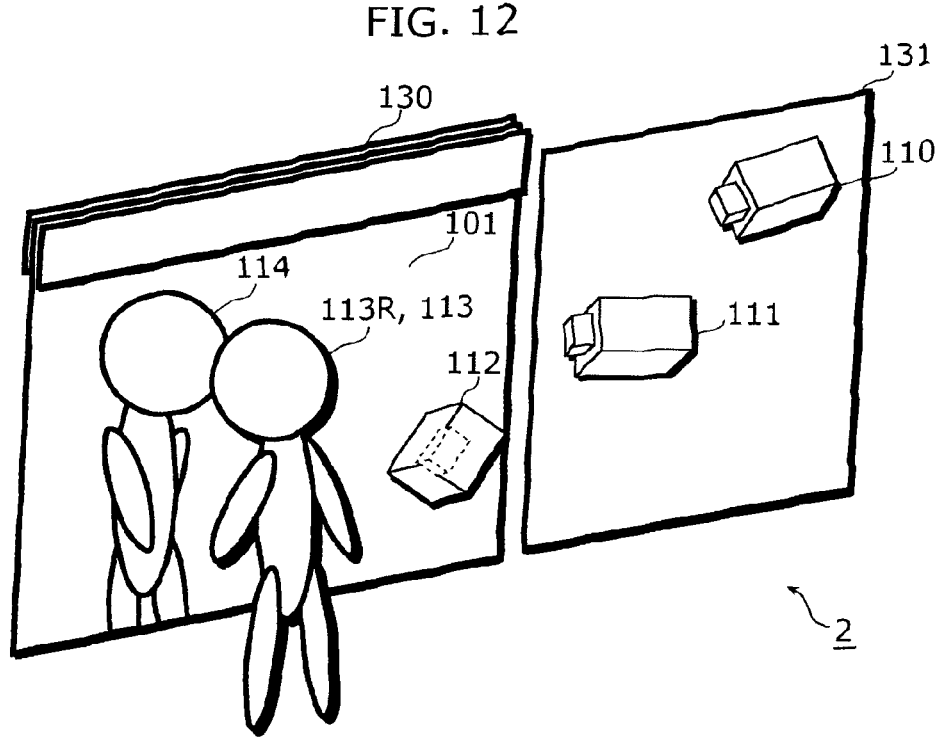
FIG. 12 is a configuration diagram showing an outline of a three-dimensional shape measuring apparatus according to a second embodiment.
Figure 13:
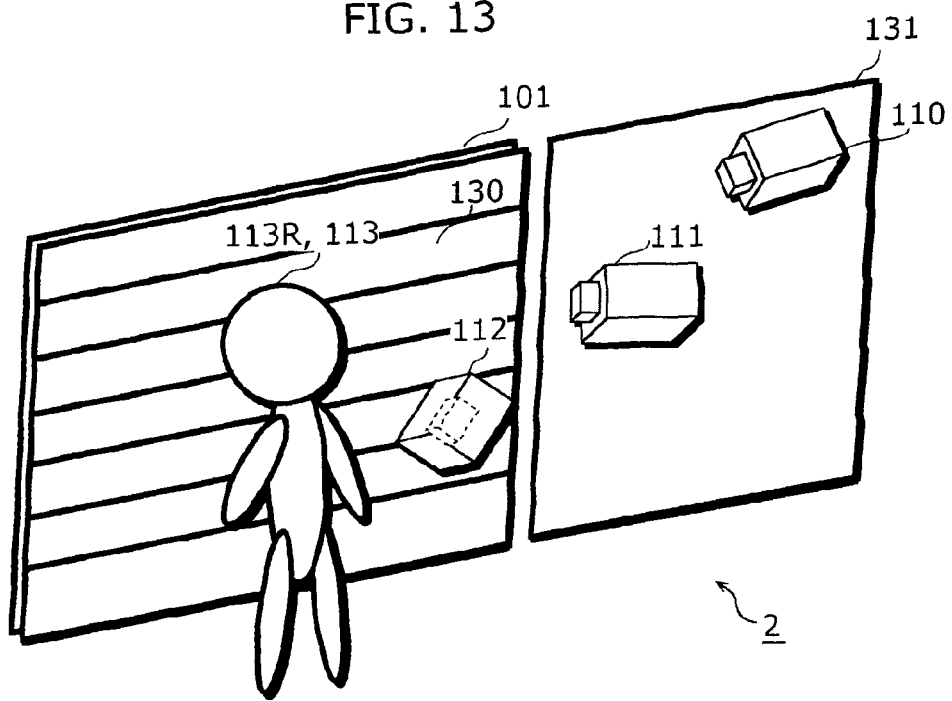
FIG. 13 is a configuration diagram showing an outline of a three-dimensional shape measuring apparatus according to the second embodiment.

FIGS. 12 and 13 are schematic views of a three-dimensional shape measuring apparatus 2 according to a second embodiment of the present invention.

Figure 14:
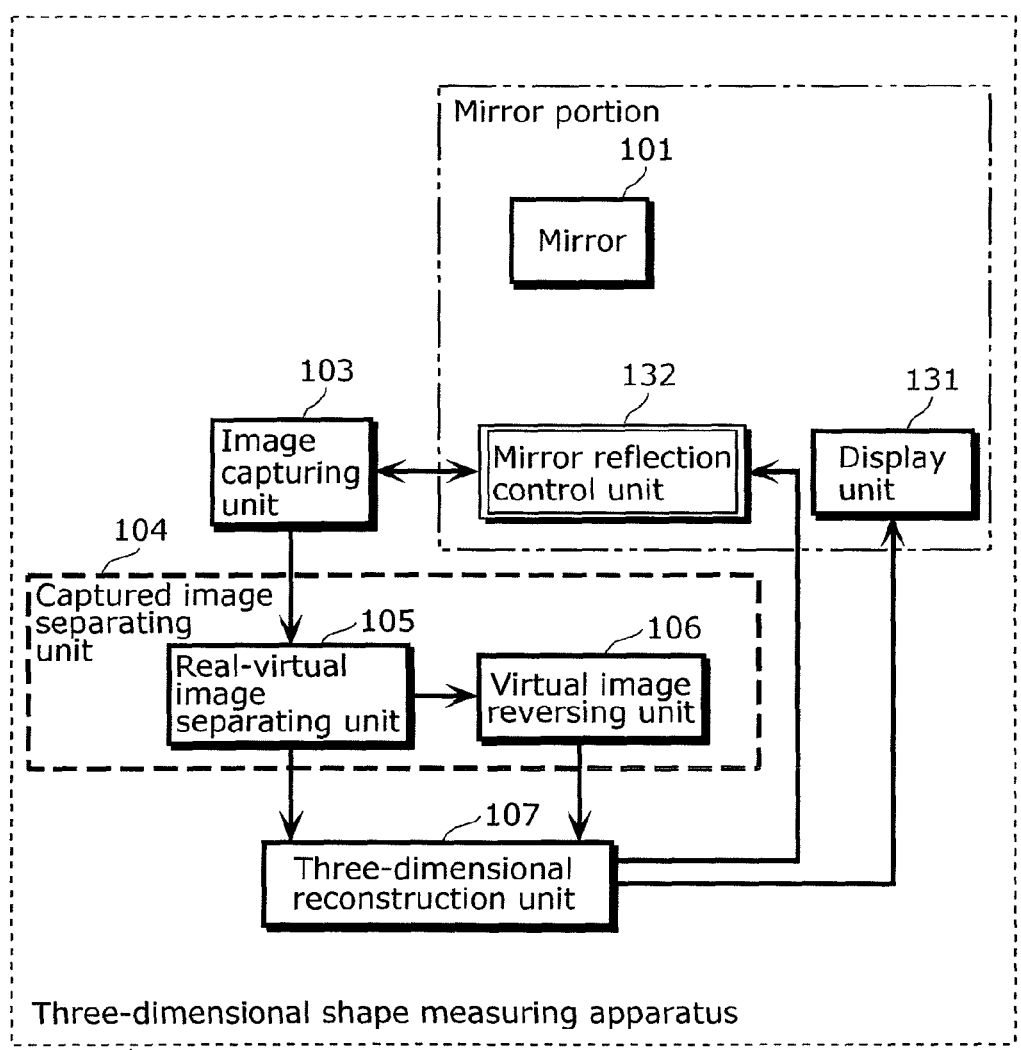
FIG. 14 is a basic configuration diagram showing each portion included in a configuration according to the second embodiment and a processing flow when three-dimensional reconstruction is performed according to the second embodiment.

FIG. 14 is a block diagram showing each portion included in the three-dimensional shape measuring apparatus 2 according to the second embodiment and a processing flow when three-dimensional reconstruction is performed using the three-dimensional shape measuring apparatus 2 according to the second embodiment of the prevent invention.

Figure 15:
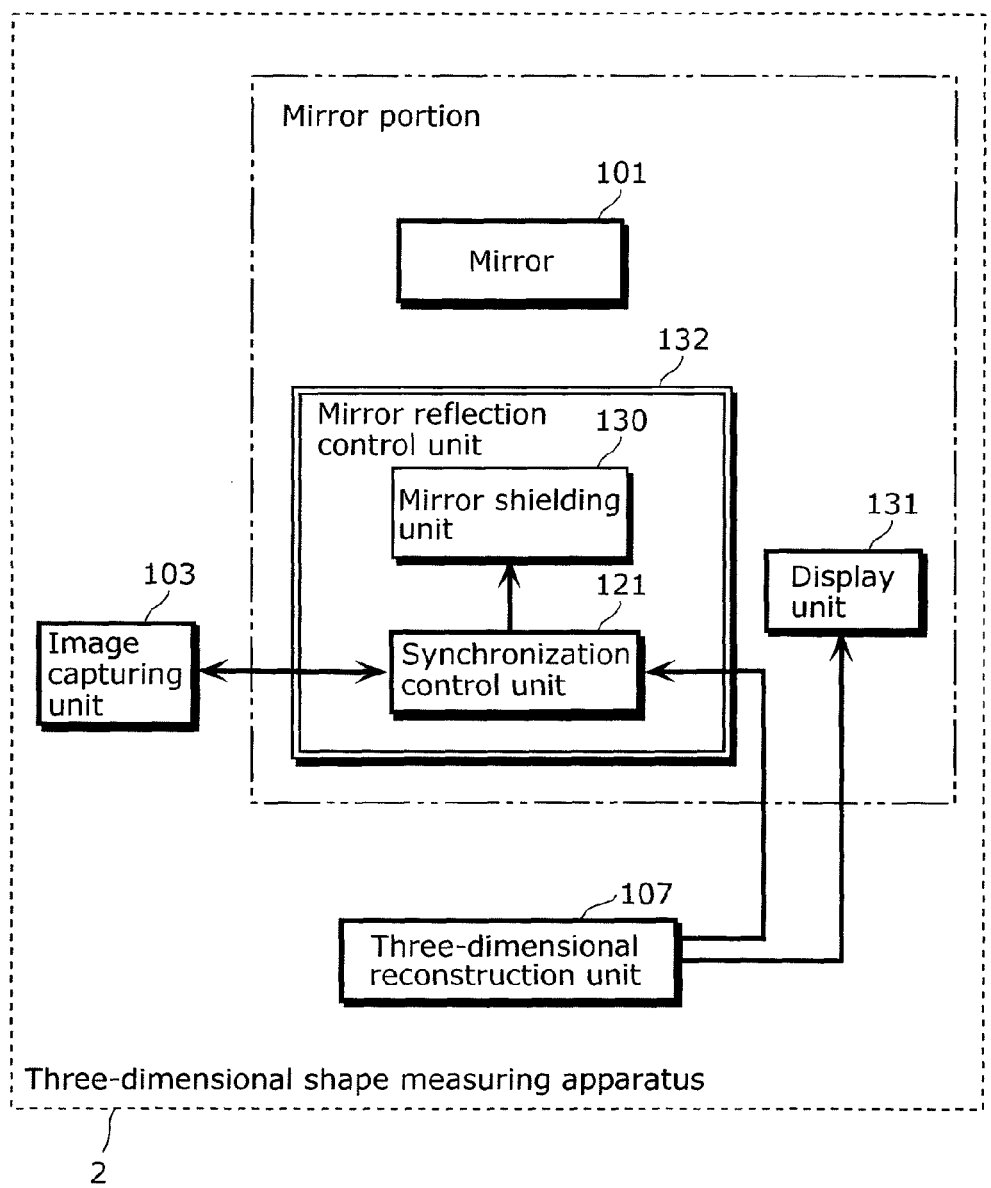
FIG. 15 is a specific configuration diagram of a mirror and a mirror reflection control unit according to the second embodiment.

FIG. 15 is a block diagram showing a configuration of the mirror 101 and a mirror reflection control unit 132 according to the second embodiment.

Figure 16:
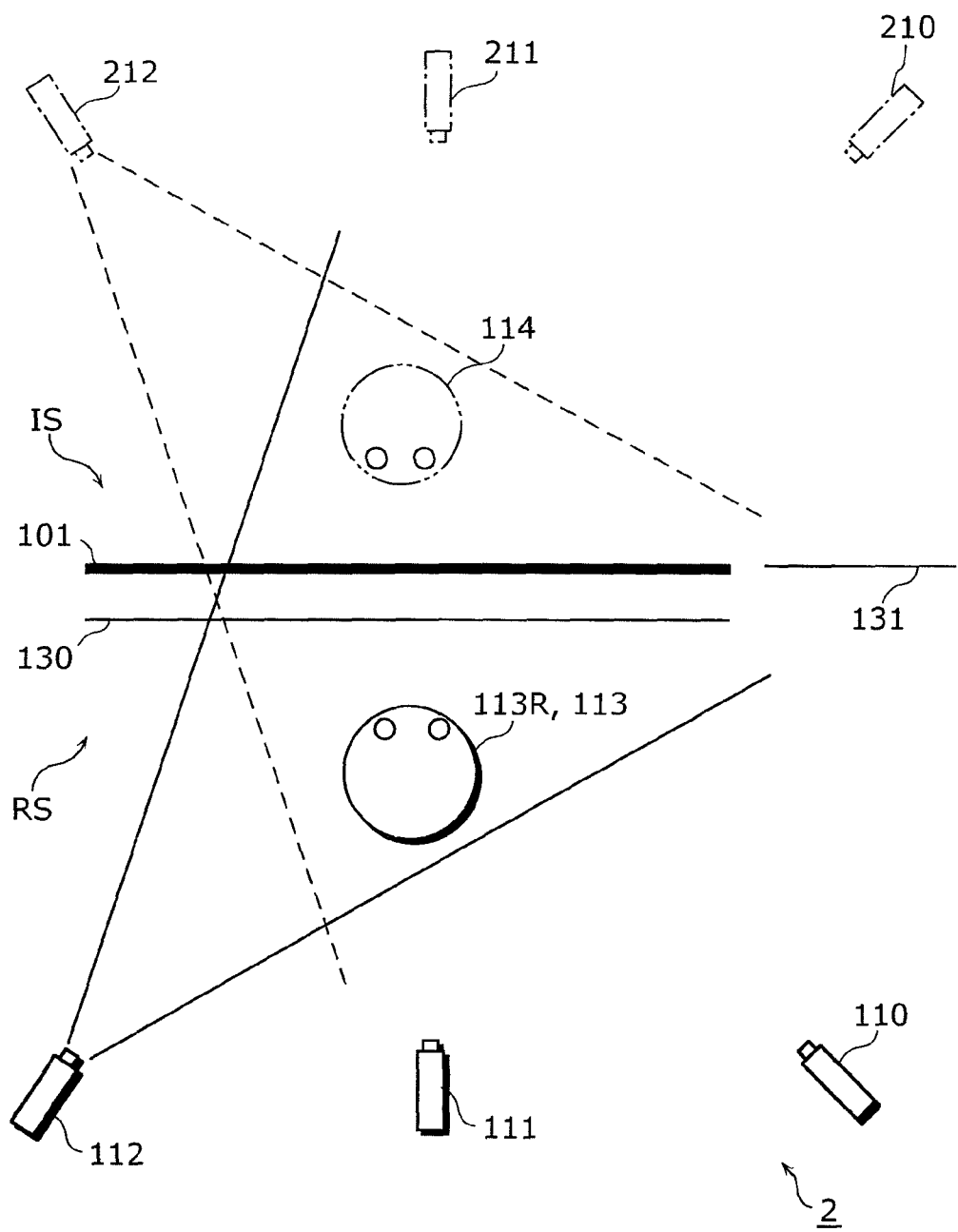
FIG. 16 is a diagram showing a positional relationship between constituent elements according to the second embodiment.

FIG. 16 is a diagram showing an example of a positional relationship between: a mirror 101; a mirror shielding unit 130; a display unit 131; image capturing apparatuses 110 to 112 and virtual image capturing apparatuses 210 to 212 which correspond to the image capturing apparatuses, respectively; and a real image 113 of an object 113R and a virtual image 114 corresponding to the real image 113.

As shown in FIGS. 12 and 13, the three-dimensional shape measuring apparatus 2 includes the mirror shielding unit 130 and the display unit 131. The three-dimensional shape measuring apparatus 2 is different from the three-dimensional shape measuring apparatus 1 according to the first embodiment in the constituent elements of the display unit 131, the mirror shielding unit 130, and the mirror reflection control unit 132 (FIGS. 14 and 15).

The display unit 131 (FIGS. 12 and 13, FIG. 14, and FIG. 15) is not intended for separating the real image 113 and the virtual image 114, unlike the display unit 120 according to the fist embodiment (see FIGS. 3 and 4). The display unit 131 is provided in a position horizontal, vertical or the like to the mirror 101 such that it can be directly seen from each capturing apparatus or a user. The display unit 131, as shown in FIG. 16, does not display an image on the reflection surface of the mirror 101 in which the virtual image 114 can be seen but outside the reflection surface of the mirror 101.

Note that preferably the mirror 101 according to the second embodiment does not transmit, toward the surface side, the light proceeding from the reverse face side of the mirror 101 and reflecting off the mirror 101.

FIG. 12 is a diagram showing a state where the mirror shielding unit 130 does not shield the mirror 101 at all.

FIG. 13 is a diagram showing a state where the mirror shielding unit 103 shields the mirror 101.

The state of the mirror shielding unit 130 (FIGS. 12 and 13, FIG. 15, and FIG. 16) changes between a state shown in FIG. 12 where the mirror shielding unit does not shield the mirror 101 and a state shown in FIG. 13 where the mirror shielding unit blocks the reflection of the virtual image 114 like a shutter.

As an example, the mirror shielding unit 130 may have the same structure as a shutter, for example, provided at the entrance of a garage or a store and insulating the inside of the entrance from the outside. Specifically, for example, the mirror shielding unit 130 has a roll-up mechanism to roll itself upward, and includes a shielding unit which is rolled by the roll-up mechanism. The mirror shielding unit 130 may be in the state shown in FIG. 12 by the rolling of the shielding unit. Then, the shielding unit is rolled out from the winding mechanism and hangs down from the roll-up mechanism in front of the mirror 101, to thereby shield the mirror 101 and can block the light proceeding from the object 113R to the mirror 101 at a position closer to the object 113R than to the mirror 101.

With this, the shielding unit may block the reflection of the light from the virtual image 114 (see FIGS. 12 and 13).

In addition, for example, the mirror shielding unit 130 need not have the roll-up mechanism or the like but may be, for example, a panel provided in front of the mirror 101 at a position through which the light from the object 113R toward the mirror 101 passes. Here, in a transmissive state (the state shown in FIG. 12), for example, each of the image capturing apparatuses provided at the surface side of the mirror 101 is caused to capture the virtual image 114 by transmitting both the light from the object 113R and the reflected light that is the transmitted light reflected by the mirror 101. On the other hand, in a non-transmissive state (the state shown in FIG. 13), it is assumed that, for example, this panel changes into a non-transmissive color that does not transmit the light such as black, thereby shielding the mirror 101 by blocking the light from the object 113R so that the virtual image 114 is not reflected in the mirror 101. In addition, this panel changes the state between the transmissive state and the non-transmissive state. This panel may be, for example, a liquid crystal panel.

The three-dimensional shape measuring apparatus 2 clearly indicates, using such a mirror shielding unit 130, which portion in the captured image corresponds to the virtual image 114 and which portion corresponds to the real image 113 that can be directly captured by each of the image capturing apparatuses, as in the first embodiment (see FIGS. 5 to 7, FIGS. 8 to 10, FIG. 11, and so on).

The mirror reflection control unit 132 (FIGS. 14 and 15) includes the mirror shielding unit 130 and the synchronization control unit 121.

The synchronization control unit 121 switches the state between the above-described state where the mirror shielding unit 130 (see FIGS. 12, 13, and so on) does not shield the mirror 101 at all (the state shown in FIG. 12) and the state where the mirror shielding unit 130 shields the mirror 101 (the state shown in FIG. 13) in synchronization with the image capturing performed by the image capturing unit 103 (FIG. 14), and the image capturing unit 103 captures the two states separately.

That is, in Steps S201 and S202 in FIG. 11, the real-virtual image separating unit 105 sets the state of the mirror shielding unit 130 for performing image capturing to each of the states in FIG. 12 and FIG. 13 by switching whether or not to input a predetermined display instruction signal into the synchronization control unit 121.

Here, the image captured when the mirror shielding unit 130 is in the state shown in FIG. 13 may be, for example, an image in which the virtual image 115 is completely blocked by the mirror shielding unit 130 and from which the virtual image 115 has completely disappeared.

Then, the real-virtual image separating unit 105 extracts a combination of the real image 113 and the virtual image 114 (the extracted image shown in FIG. 7) from the image captured when the mirror shielding unit 130 does not shield the mirror 101 at all (the image shown in FIG. 12) in the same manner as described in the first embodiment (Steps S201, S203, and S205 in FIG. 11).

On the other hand, the real-virtual image separating unit 105 performs the same processing on the image captured when the mirror shielding unit 130 shields the mirror 101 and from which the virtual image 115 has completely disappeared. That is, the real-virtual image separating unit 105 extracts a real image portion (real image 113) of the object 113R by calculating the difference between the two images captured in the states where the object 113R is present and where the object 113R is not present (Steps S202, 204, and 206).

Note that the real-virtual image separating unit 105 may not perform the processing in Step S207 because the real image 113 is extracted in Step S206. However, in the case where the virtual image 115 (see FIGS. 8 to 10) has not completely disappeared from the image and where an image including both the real image 113 and the virtual image 115 (the image shown in FIG. 10) is extracted, the real-virtual image separating unit 105 may extract the real image 113 by performing the processing described in the first embodiment or the like in Step S207.

Then the real-virtual image separating unit 105 further extracts, in Step S208, an image including only a virtual image portion (virtual image 114 shown in FIG. 7) of the object 113R by calculating the difference between the two extraction results, that is, the extracted image extracted in Step S205 and including both the real image 113 and the virtual image 114 (the extracted image shown in FIG. 7), and the real image 113 extracted in Step S206.

Note that in the present embodiment an example of the case where the mirror shielding unit 130 is like a shutter, for example, has been shown. This means that the mirror shielding unit 130 may be anything as long as it physically blocks the reflection of the mirror 101. In addition, the mirror shielding unit 130 may reduce a transmission amount of the reflected light from the mirror 101 instead of completely blocking the reflection of the mirror 101. In this case, for example, the real-virtual image separating unit 105 may perform, as described above, the processing in Step S207, and may perform the same image processing as in the first embodiment so as to extract the real image portion and the virtual image portion.

Thus configured is the three-dimensional shape measuring apparatus (three-dimensional shape measuring apparatus 2) that changes the light amount of the virtual image in which the light amount changing unit (mirror shielding unit 130) blocks at least one (incident light) of the incident light entering the mirror portion and the reflected light reflected by the mirror portion.

Here, the light amount changing unit changes the light amount of the virtual image by changing the amount of the reflected light that is reflected by the mirror portion.

In addition, this three-dimensional shape measuring apparatus includes a three-dimensional shape display unit (display unit 131) which displays a three-dimensional shape reconstructed by the reconstruction unit.

Embodiment 3

FIGS. 17 and 18 are schematic views of a three-dimensional shape measuring apparatus 3 according to a third embodiment of the present invention.

Figure 19:
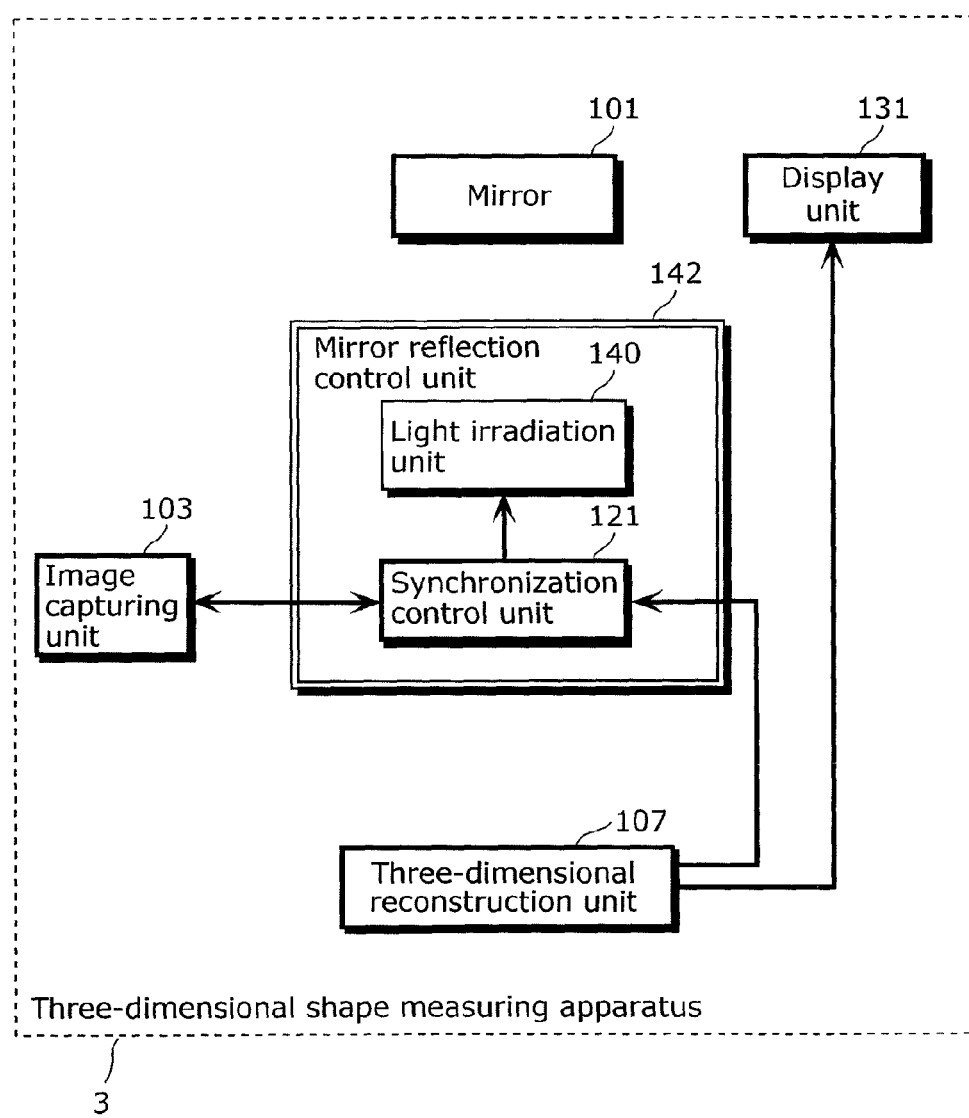
FIG. 19 is a specific configuration diagram of a mirror and a mirror reflection control unit according to the third embodiment.

FIG. 19 is a block diagram showing a configuration of the mirror reflection control unit 142 according to the third embodiment. Note that each of the portions included in the three-dimensional shape measuring apparatus 3, except the mirror reflection control unit 142, and the block diagram showing a flow of the processing performed when the three-dimensional reconstruction is performed according to the present embodiment are the same as in the first embodiment (see FIG. 2), and therefore the detailed description thereof will be omitted.

As shown in FIGS. 17 to 19, the three-dimensional shape measuring apparatus 3 includes a light irradiation unit 140.

Figure 20:
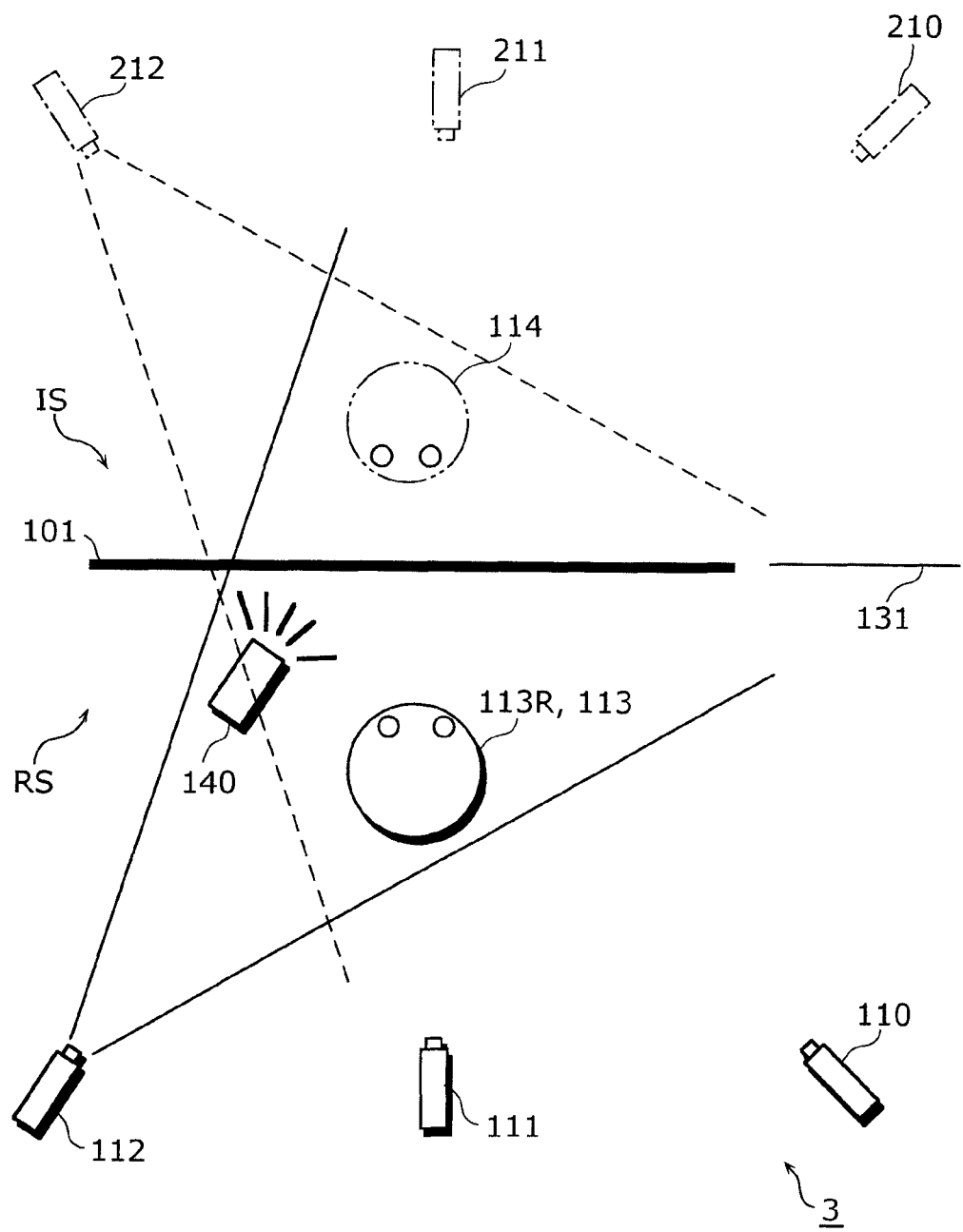
FIG. 20 is a diagram showing a positional relationship between constituent elements according to the third embodiment.

FIG. 20 is a diagram showing an example of a positional relationship between: a mirror 101; a light irradiation unit 140; a display unit 131; image capturing apparatuses 110 to 112 and virtual image capturing apparatuses 210 to 212 that correspond to the image capturing apparatuses, respectively; and a real image 113 of the object 113R and a virtual image 114 corresponding to the real image 113.

The three-dimensional shape measuring apparatus 3 according to the present embodiment is different from the three-dimensional shape measuring apparatus 1 according to the first embodiment in constituent elements of the light irradiation unit 140 (FIGS. 17 to 20), the display unit 131 (FIGS. 17 to 20), and the mirror reflection control unit 142 (FIG. 19).

The display unit 131 is not intended for separating the real image 113 and the virtual image 114, unlike the display unit 120 according to the first embodiment (see FIG. 3). The display unit 131 is the same as, for example, the display unit 131 shown in the second embodiment (see FIGS. 12, 13, 16, and so on).

The mirror reflection control unit 142 (FIG. 19) includes the light irradiation unit 140 (see FIGS. 17, 18, and 20) and a synchronization control unit 121.

FIG. 17 shows a state where the mirror 101 is not irradiated with light by the light irradiation unit 140. In addition, FIG. 18 shows a state where the mirror 101 is irradiated with light by the light irradiation unit 140.

The virtual image 144 shown in FIG. 18 represents a virtual image reflected in the mirror 101 when the mirror 101 is irradiated with light by the light irradiation unit 140.

The light irradiation unit 140 is a portion for irradiating the mirror 101 with light. The light irradiation unit 140 causes a change in the reflection of the virtual image 114; that is, the light irradiation unit 140 causes a change in the light of the virtual image 114 that is reflected.

Specifically, in the three-dimensional shape measuring apparatus 3, the light irradiated by the light irradiation unit 140 is reflected by the mirror 101. With this, this reflected light interferes with reflected light which forms a virtual image 114 of the object 113R which is originally reflected in the mirror 101. This interference causes a phenomenon in which a change is caused in the virtual image 114 of the object 113R, which image is captured by the image capturing unit 103. By using this phenomenon, the three-dimensional shape measuring apparatus 3 clearly indicates which portion in the captured image corresponds to the virtual image 114 and which portion corresponds to the real image 113 that can be directly captured by the image capturing unit 103, as in the first embodiment.

That is, the light irradiation unit 140 causes a change in the virtual image 114 to be captured, by irradiating light and causing the irradiated light to be reflected by the mirror 101 and thereby causing the light from the virtual image 114 created by the mirror and the light that is irradiated and then reflected by the mirror 101 to interfere with each other.

For example, the light irradiation unit 140 irradiates the mirror 101 with the light so that part of the light of the virtual image 114 created by the mirror 101 includes the reflected light that is irradiated and reflected by the mirror 101. With this, the light irradiation unit 140 decreases a contrast of the virtual image 114. Then, for example, the light irradiation unit 140 decreases the contrast in the same manner as: when humans look at a neighborhood region of the sun, the contrast of the neighborhood region decreases due to the strong sunlight, and, among regions in the sky, an image of the neighborhood region of the sun changes with respect to an image of an outer region of the neighborhood region. That is, the light irradiation unit 140 decreases the contrast of the virtual image 144 (FIG. 18) to a lower level than the contrast of the virtual image 114 (FIG. 17) in the case where no irradiation is performed, by causing the reflected light to be included in the light of the virtual image 114. In other words, the light irradiation unit 140 decreases the contrast of the virtual image 144 to a lower level than the contrast of the real image 113 (FIG. 18) captured with the virtual image 144. Note that the light irradiation unit 140 may cause a phenomenon known as color fading by irradiation, to thereby changing the light amount of the virtual image, from the light amount of the virtual image 114 (FIG. 17) that is captured when irradiation is not performed to the light amount of the virtual image 144 that is captured when irradiation is performed.

Here, the light irradiation unit 140 switches an irradiation state and a non-irradiation state, and changes the captured image by switching to the irradiation state (FIG. 18) and also renders, at the same time, the captured image an ordinary image (FIG. 17) by switching to the non-irradiation state.

The synchronization control unit 121 switches between the state where the mirror 101 is not irradiated by the light irradiation unit 140 and the state where the mirror 101 is irradiated in synchronization with the image capturing performed by the image capturing unit 103. The image capturing unit 103 performs the image capturing in each of the two states described above.

The real-virtual image separating unit 105 extracts, in the same manner described in the first embodiment, a combination of the real image 113 and the virtual image 114 (FIG. 7) from the image that is captured when the mirror 101 is not irradiated with light by the light irradiation unit 140 (FIG. 17) (Steps S201, S203, and S205). In addition, the real-virtual image separating unit 105 also performs, in the same manner, processing on the image captured when the mirror 101 is irradiated with light by the light irradiation unit 140. That is, the real-virtual image separating unit 105 extracts an image that is a combination of only the real image 113 and the virtual image 115 of the object 113R (see FIG. 10) by calculating the difference between the two images captured in the states where the object 113R is present (see FIGS. 18 and 8) and where the object 113R is not present (see FIG. 9) (Steps S202, S204, and S206). Furthermore, the real-virtual image separating unit 105 separates the real image 113 and the virtual image 114 based on these extracted images (Steps S207 and S208).

Note that the present embodiment shows an example where one light irradiation unit 140 is provided for the mirror 101, but any number of light irradiation units 140 may be provided.

In addition, according to the present embodiment, the mirror 101 is directly irradiated by the light irradiation unit 140, but the light irradiation unit 140 may irradiate (or reflect) indirect light as long as such light affects the light that is reflected by the mirror 101.

Thus configured is the three-dimensional shape measuring apparatus in which the light amount changing unit (light irradiation unit 140) irradiates the mirror portion with light so as to change the contrast of the virtual image formed with the light reflected by the mirror portion.

Embodiment 4

Figure 21:
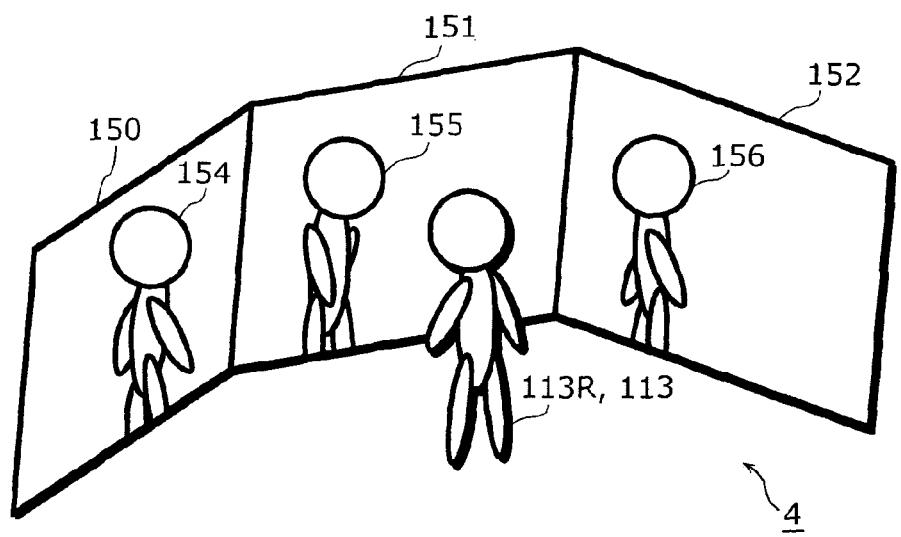
FIG. 21 is a configuration diagram showing an outline of a three-dimensional shape measuring apparatus according to a fourth embodiment.
Figure 22:
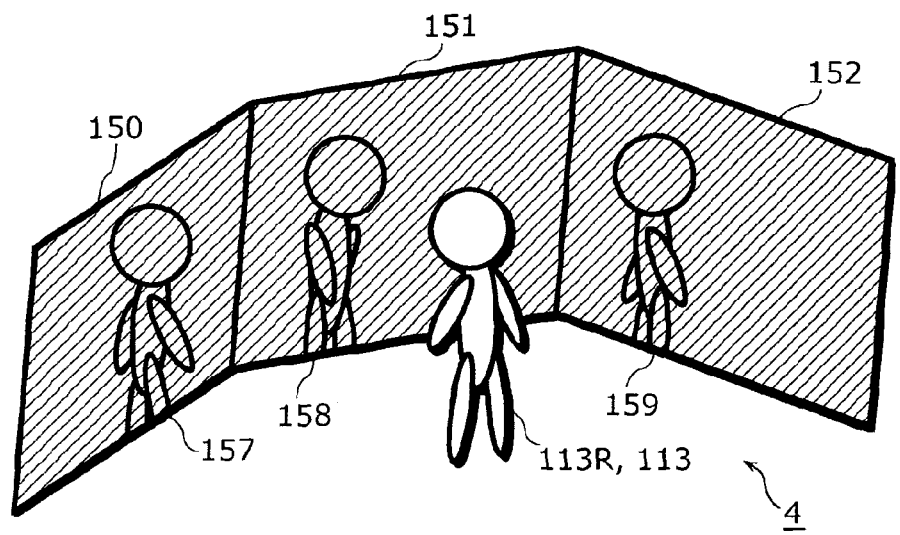
FIG. 22 is a configuration diagram showing an outline of a three-dimensional shape measuring apparatus according to the fourth embodiment.

FIGS. 21 to 22 are configuration diagrams showing an outline of a three-dimensional shape measuring apparatus 4 according to a fourth embodiment.

As shown in FIGS. 21 to 22, the three-dimensional shape measuring apparatus 4 includes three mirrors, that is, mirrors 150 to 152.

Here, each of virtual images 154 to 156 shown in FIGS. 21 and 22 is a virtual image of the object 113R which is reflected in a corresponding one of the mirrors 150 to 152.

Figure 23:
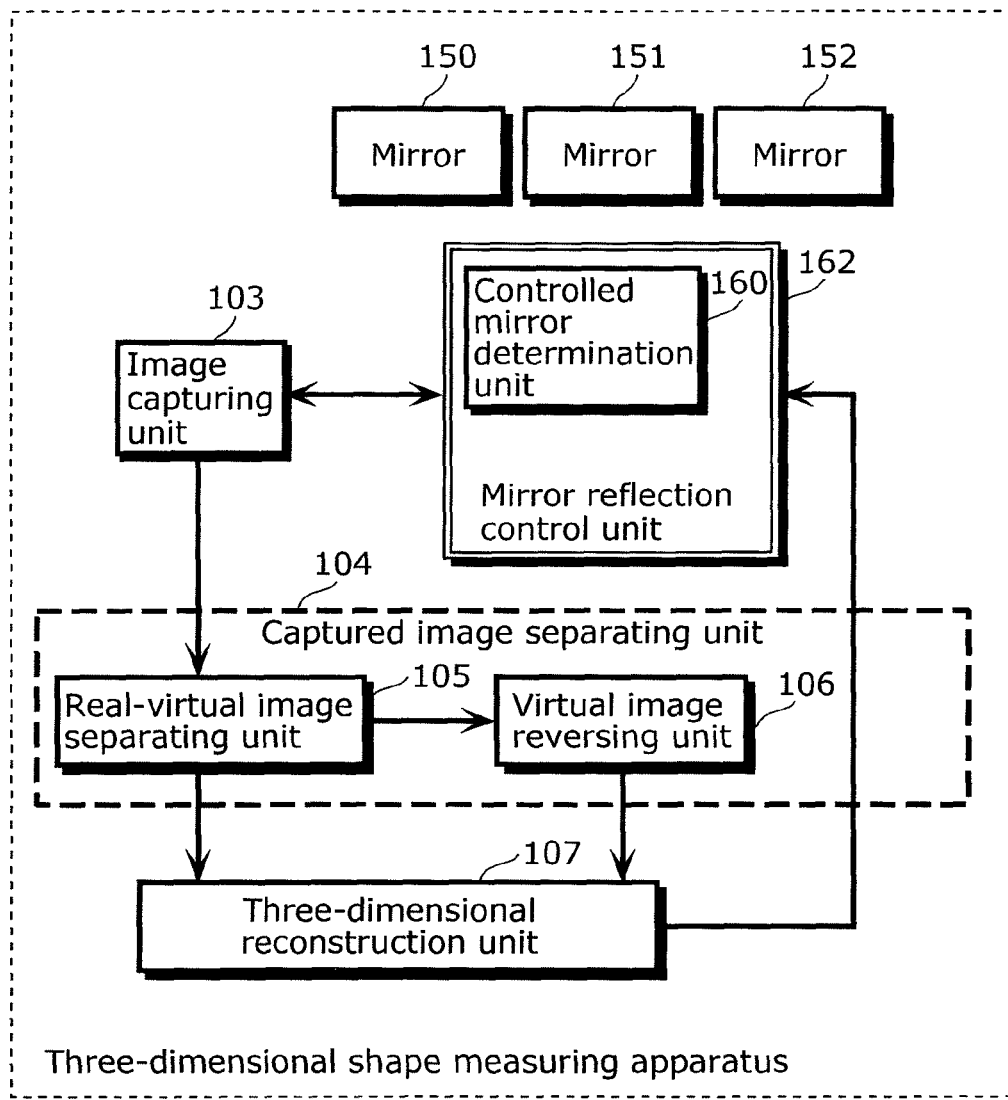
FIG. 23 is a basic configuration diagram showing each portion included in a configuration according to the fourth embodiment and a processing flow when three-dimensional reconstruction is performed in the fourth embodiment.

FIG. 23 is a block diagram showing each portion included in the three-dimensional shape measuring apparatus 4 according to the present invention and a flow of the processing performed when the three-dimensional shape measuring apparatus 4 performs three dimensional reconstruction.

Figure 24:
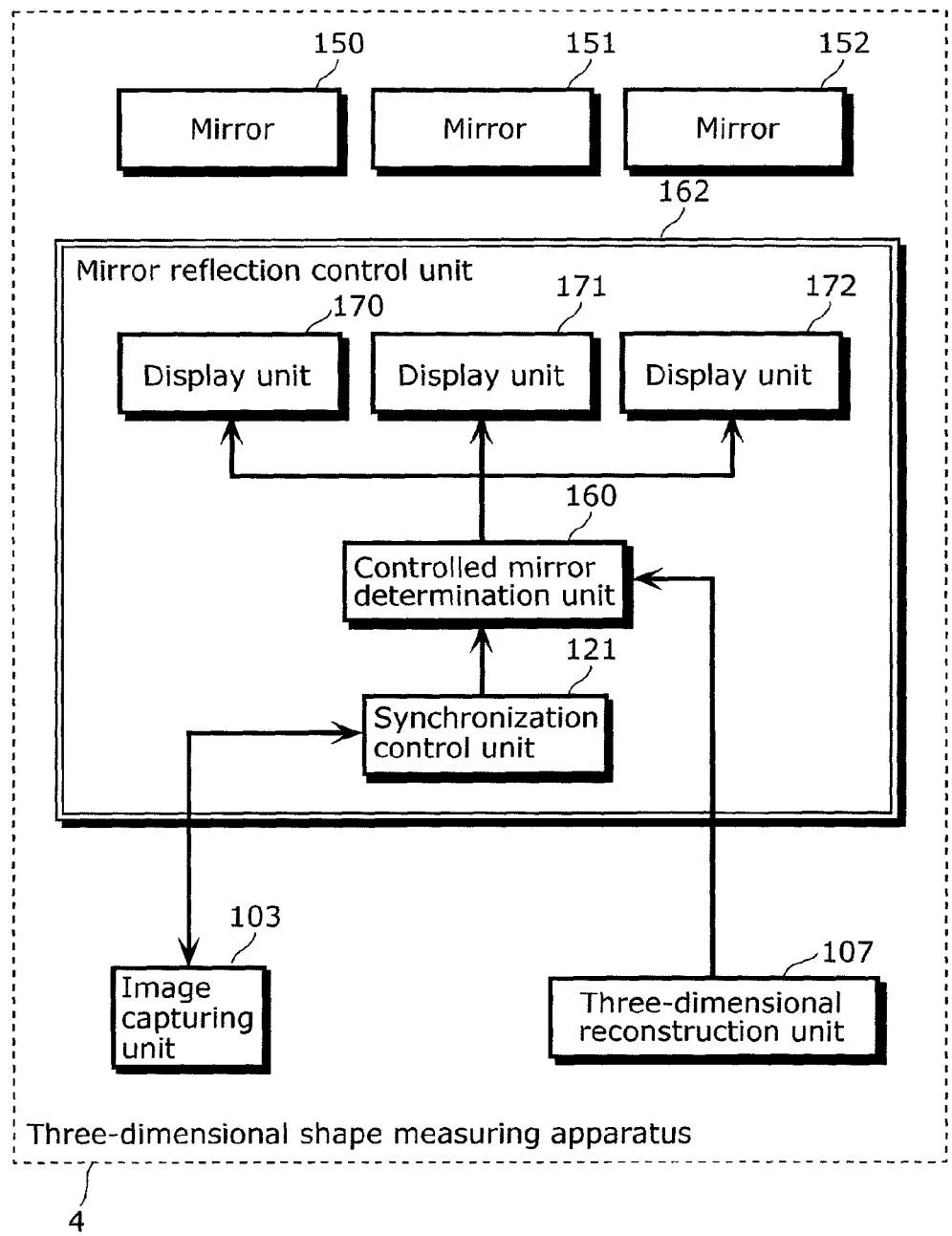
FIG. 24 is a specific configuration diagram of a mirror and a mirror reflection control unit according to the fourth embodiment.

FIG. 24 is a block diagram showing constituent elements of the three mirrors from 150 to 152, and the mirror reflection control unit 162. Note that FIG. 24 shows a detailed configuration of the mirror reflection control unit 162.

The mirror reflection control unit 162 includes three display units 170 to 172, and a controlled mirror determination unit 160 (see FIG. 23), and a synchronization control unit 121.

The three-dimensional shape measuring apparatus 4 according to the fourth embodiment has a structure different from the structure described in the first embodiment in: the number of mirrors; constituent elements of the mirror reflection control unit 162 (FIG. 24), and inclusion of the controlled mirror determination unit 160 (FIG. 24).

With this, the three-dimensional shape measuring apparatus 4 captures, with a single capturing apparatus, the real image 113 of the object 113R and plural virtual images (virtual images 154, 155, 156, and so on) at a time. With this, the three-dimensional shape measuring apparatus 4 can obtain an image of the object 113R, which is reflected at a side of the mirrors 150 and so on and is originally in a blind spot unseen from the image capturing apparatus, using these mirrors 150 to 152.

Each of the mirrors 150 to 152 (FIGS. 21, 22, 23, and 24) is the same as the mirror 101 in the first embodiment. The mirrors 150 to 152 have different positions and directions, and form the three different virtual images 154, 155, and 156 of the object 113R as seen from different positions.

The display units 170 to 172 (FIG. 24) correspond to the mirrors 150 to 152, respectively. Each of the display units 170 and so on has the same positional relationship with respect to a corresponding one of the mirrors as the relationship between the mirror 101 and the display unit 120 in the first embodiment (see FIG. 3 and so on), and each of the display units gives the same effect to the light of the virtual image formed by the corresponding one of the mirrors as the effect that the display unit 120 has given to the light of the virtual image 114 in the first embodiment. That is, each of the display units is provided at the reverse face side of a corresponding one of the mirrors, and changes the virtual image created by the corresponding one of the mirrors by displaying an image, so that the light of the image, which has passed through the mirror, appears in the surface side of the mirror.

Note that the image displayed by each of the display units will be described in detail later.

The controlled mirror determination unit 160 (FIGS. 24 and 23) is a portion which determines on which display unit the three-dimensional shape measuring apparatus 4 is to perform display, from among the three display units 170 to 172 for the mirrors. The controlled mirror determination unit 160, for example, sends a predetermined signal to each of the determined display units to perform the display to cause an image to be displayed in each of the display units while at the same time causing a display unit that is not determined to withhold display of an image.

Figure 25:
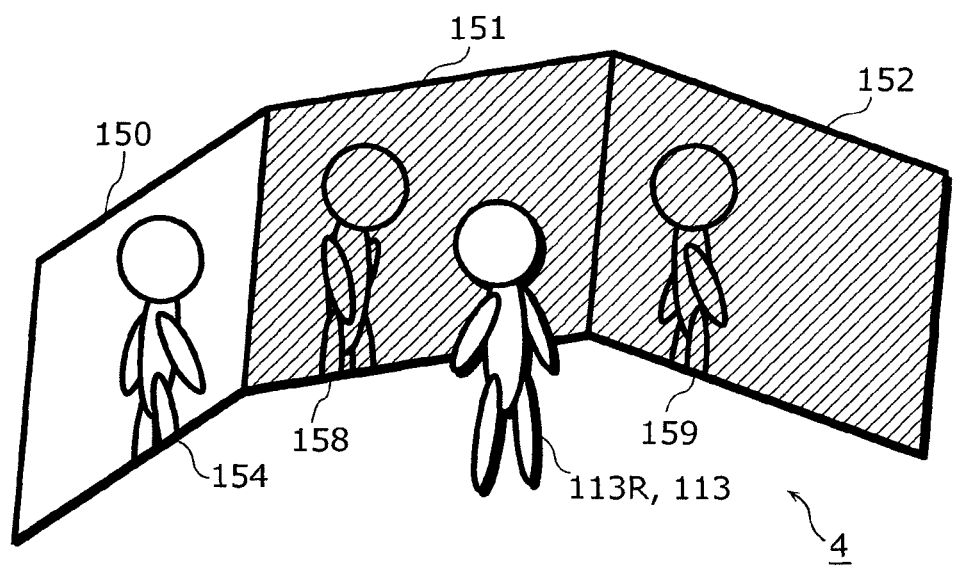
FIG. 25 is a configuration diagram showing an outline of a three-dimensional shape measuring apparatus according to the fourth embodiment of the present invention.
Figure 26:
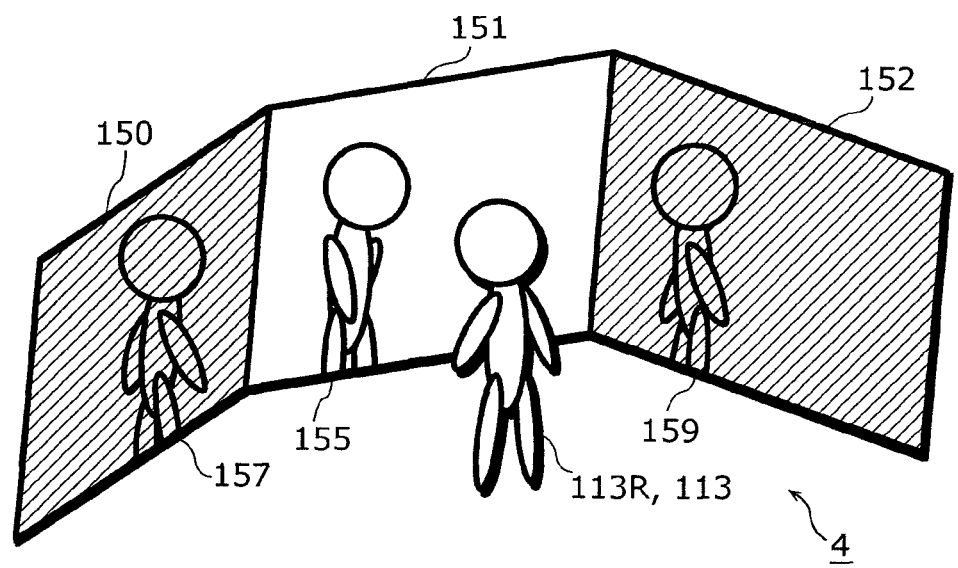
FIG. 26 is a configuration diagram showing an outline of a three-dimensional shape measuring apparatus according to the fourth embodiment of the present invention.

FIGS. 25 and 26 are diagrams showing a state where the controlled mirror determination unit 160 causes images to be displayed in only a part of the display units.

FIGS. 25 and 26, and FIGS. 21 to 22 described earlier show an operation of the controlled mirror determination unit 160. FIG. 21 is a diagram showing a state where the controlled mirror determination unit 160 performs control such that none of the display units displays an image. In addition, FIG. 22 is a diagram showing a state where the controlled mirror determination unit 160 performs control such that all the display units display images. In addition, FIG. 25 is a diagram showing a state where the controlled mirror determination unit 160 performs control such that only the display units 171 and 172, that is, only the two display units corresponding to the mirrors 151 and 152 display images. Then, FIG. 26 is a diagram showing a state where the controlled mirror determination unit 160 performs control such that only the display units 170 and 172, that is, only the two display units corresponding to the mirrors 150 and 152 display images.

The controlled mirror determination unit 160 selects one of these four types of controls shown in FIGS. 21, 22, 25, and 26, to perform the selected control.

The synchronization control unit 121 (FIG. 24) has a function to switch the display in the display units in synchronization with the image capturing performed by the image capturing unit 103. The synchronization control unit 121 switches the four types of states described above in FIGS. 21, 22, 25, and 26, using the controlled mirror determination unit 160 described above, in synchronization with the image capturing performed by each of the image capturing apparatuses, and causes the image capturing to be performed in each of the states. That is, for example, the synchronization control unit 121 detects the timing of the image capturing, and performs, with the detected timing, a type of control indicated by a predetermined type instruction signal inputted prior to the detection, on the controlled mirror determination unit 160. With this, the synchronization control unit 121 causes each of the image capturing apparatuses to perform image capturing in the state under the control of the type (FIGS. 21, 22, 25, and 26).

The captured image separating unit 104 (FIG. 23) includes the real-virtual image separating unit 105 and a virtual image reversing unit 106.

The real-virtual image separating unit 105, for example, inputs each of the four types of instruction signals into the synchronization control unit 121, to thereby cause the image of the state of each of the types (FIGS. 21, 22, 25, and 26) to be captured. With this, by obtaining each of the captured images, and the like, the real-virtual image separating unit 105 obtains an image captured in each of the states shown in FIGS. 21, 22, 25, and 26. For example, the real-virtual image separating unit 105 obtains, in Step S201 shown in FIG. 11, the image captured in the state shown in FIG. 21, and obtains, in Step S202, each of the images captured in the states shown in FIGS. 22, 25, and 26.

Note that the real-virtual image separating unit 105 causes the capturing of these four images to be performed such that the object 113R does not move or the motion is within a predetermined small range. The real-virtual image separating unit 105 causes such image capturing to be performed, for example, within a predetermined, sufficiently short time range.

On the other hand, the real-virtual image separating unit 105 holds each of the images captured in the four types of states shown in FIG. 21 and so on where the object 113R is not present.

Then, the real-virtual image separating unit 105, as in the first embodiment, extracts an extracted image from the image obtained, in Step S201, when none of the display units displays an image (the image shown in FIG. 21), and an image which is held and which is obtained in the state shown in FIG. 21 when no object 113R is present. That is, the real-virtual image separating unit 105 extracts, from each of these two images, an extracted image (see FIG. 7, extracted image) that is a combination of the real image 113 and the virtual images 154, 155, and 156 that are reflected in all the mirrors (Steps S203 and S205). In addition, the real-virtual image separating unit 105 extracts, likewise, an extracted image from the images captured in the other states (FIGS. 22, 25, and 26) and held images which are obtained in the states where the images are captured. That is, based on these two images, the real-virtual image separating unit 105 extracts a combination (extracted image, see FIG. 10) of the real image 113 of the object 113R and the virtual images 157, 158, 159, and so on of which the light amount has been changed, by calculating the difference between the two images captured in the states where the object 113R is present and where the object 113R is not present (Steps S204 and S206). Note that the real-virtual image separating unit 105 extracts, from the captured image shown in FIG. 22, an extracted image in which the light amount of all the three virtual images 157 and so on has been changed. In addition, the real-virtual image separating unit 105 extracts, from the image shown in FIG. 25, an extracted image in which only the light amount of the virtual images 158 and 159 has been changed and which includes the virtual image 154 having a normal light amount. In addition, the real-virtual image separating unit 105 extracts, from the image in FIG. 26, an extracted image in which only the light amount of the virtual images 157 and 159 has been changed and which includes a virtual image 155 having a normal light amount.

Thus, the real-virtual image separating unit 105 obtains the respective extracted images of the four types, that is, the extracted image related to FIG. 21, and the extracted images related to FIGS. 22, 25, and 26 (Steps S205 and S206).

In addition, the real-virtual image separating unit 105 further extracts only the real image 113 having a smaller difference, by comparing the extraction result obtained in the state where none of the display units displays anything (the extracted images related to FIG. 21) with the extraction result from the image captured in the state where all the display units display images (the extracted image related to FIG. 22) (Step S207).

Then, the real-virtual image separating unit 105 extracts the virtual images 154, 155, and 156, except the real image 113 in the following manner.

Specifically, the real-virtual image separating unit 105 specifies, as the virtual images 154 and the real image 113, a portion having a larger difference from the extracted image in FIG. 22, from the extraction result obtained from the image captured in the state where only the display units 171 and 172 display images (the extracted images shown in FIG. 25). Then, the real-virtual image separating unit 105 extracts the virtual image 154 in the mirror 150 from the specified virtual image 154 and real image 113, by excluding the real image 113 previously extracted in Step S207 (Step S208).

In addition, the real-virtual image separating unit 105 extracts the virtual image 155 in the mirror 151 in the same manner as above, using the extracted image shown in FIG. 26. That is, for example, the real-virtual image separating unit 105 specifies, as the real image 113 and virtual image 155, a portion included in the extracted image shown in FIG. 26 and having a larger difference from the extracted image shown in FIG. 22, and extracts the virtual image 155 from the specified real image 113 and virtual image 155, by excluding the real image 113 previously extracted in Step S207.

Furthermore, the real-virtual image separating unit 105 extracts the remaining virtual image 156 in the mirror 152, by excluding the real image 113 previously specified in Step S207 and each of the virtual images 154 and 155 in the mirrors 150 and 151 that are previously specified in Step S208, from the extraction result (extracted images) from the image captured when none of the display units 170 to 172 displays anything (FIG. 21) (Step S208).

With this, the real-virtual image separating unit 105 specifies all the images of the object 113R that are to be specified, that is, the real image 113 and the virtual images 154, 155, and 156.

Thus, in the three-dimensional shape measuring apparatus 4 according to the fourth embodiment, it is clearly indicated which portion in the captured image corresponds to the virtual images 154 to 156 and which portion corresponds to the real image 113 that can be directly captured by the image capturing apparatus, as in the three-dimensional shape measuring apparatus 1 according to the first embodiment. That is, the three-dimensional shape measuring apparatus 4 specifies each of the virtual images 154 to 156 and the real image 113.

Furthermore, as described above, separation is also performed to indicate which virtual image is reflected in which mirror because the three-dimensional shape measuring apparatus 4 according to the present embodiment is provided with the three mirrors from 150 to 152 and thus there is a possibility of generating a virtual image corresponding to each of the provided mirrors 150 to 152.

The virtual image reversing unit 106 reverses each of the virtual images 154, 155, and 156 thus specified (Step S209).

The three-dimensional shape measuring apparatus 4 uses each of the virtual images 154 to 156 as an image from a virtual image capturing apparatus corresponding to the virtual image. That is, the three-dimensional shape measuring apparatus 4 uses each of the virtual images, in the manner described below, as an image of the object 113R captured by the virtual image capturing apparatus when installing the virtual image capturing apparatus at a position plane-symmetrical to the position of the image capturing apparatus which has actually captured the virtual image, with respect to the mirror in which the virtual image is reflected.

By performing image capturing only once using a single unit of an image capturing apparatus, the three-dimensional shape measuring apparatus 4 obtains images captured by plural (four) capturing apparatuses, including the images captured by the three virtual image capturing apparatuses corresponding to the image capturing apparatuses.

That is, the three-dimensional reconstruction unit 107 obtains, from the real-virtual image separating unit 105, four images of the object 113R per image capturing apparatus, and thus obtains 3×4=12 images of the object 113R from the three image capturing apparatuses 110 and so on.

Then, the three-dimensional reconstruction unit 107 performs three-dimensional reconstruction of the object 113R, using these 12 obtained images of the object 113R. Note that more specifically, the three-dimensional reconstruction unit 107 performs three-dimensional reconstruction using these 12 images and the image capturing positions for these images. Here, the total number of capturing positions for these images is 3+9=12, which include: the image capturing positions of the three real capturing apparatuses, and the image capturing positions of the three virtual image capturing apparatuses corresponding to each of the three image capturing apparatuses (3×3=9 virtual image capturing positions).

Here, as the images to be displayed by the display units 170 to 172, any image in a predetermined color, a predetermined pattern, or the like may be displayed as long as the image influences the appearances of the virtual images of the object 113R reflected in the mirrors 150 to 152 (see FIGS. 21, 22, 25, and 26). Use of a color that does not appear in the image captured when none of the display units displays an image (the state shown in FIG. 21) or a complementary color of the object 113R facilitates separation of the real image 113 and the virtual images 154 and so on, thus producing an ideal effect. In addition, the three display units need not show the same image. That is, these display units may include two display units which display different images.

Note that in the fourth embodiment, an example of the case where the number of the mirrors 150 and so on and the display unit 170 and so on is three, but the same method can be applied using any number as long as the number is plural.

In addition, in the fourth embodiment, the plural display units are used, but the mirror shielding unit 130 used in the second embodiment (FIGS. 12, 13, and so on) or the light irradiation unit 140 used in the third embodiment (FIGS. 17, 18, and so on) may be used in place of each of the display units. In addition, the same method can be applied using a combination thereof. In other words, the three-dimensional shape measuring apparatus may have a structure in which a part of the three display units in the fourth embodiment is replaced with one of the mirror shielding unit 130 or the light irradiation unit 140. In addition, a part of the three display units may be replaced with the mirror shielding unit 130, and another part may also be replaced with the light irradiation unit 140.

In addition, according to the present method, image capturing has been performed in the four states, but the real image and all the virtual images may be extracted using another combination of the display units, or the number of the image capturing states may be increased to improve accuracy.

In addition, according to the present method, an example of the case where the real image of the object is directly reflected in the mirror has been described, but the number of virtual images that can be captured at a time may be increased by reflecting, in another mirror, such virtual images reflected in the mirror.

Thus configured is the three-dimensional shape measuring apparatus (three-dimensional measuring apparatus 4) in which: a mirror portion includes plural mirrors (mirrors 150, 151, and 152) each of which reflects the light proceeding from the object to the mirror; a light amount changing unit includes changing units (display units 170, 171, and 172) each corresponding to each of the mirrors, and each of the changing units changes the light amount of each of the virtual images formed with light reflected by the mirror corresponding to the changing unit; and a determination unit (controlled mirror determination unit 160) determines which mirror to use for changing the light amount from among the mirrors, and changes the light amount of the virtual image in the determined mirror using the changing unit corresponding to the determined mirror.

Embodiment 5

Hereinafter, a three-dimensional shape measuring apparatus 5 according to a fifth embodiment will be described.

Figure 27:
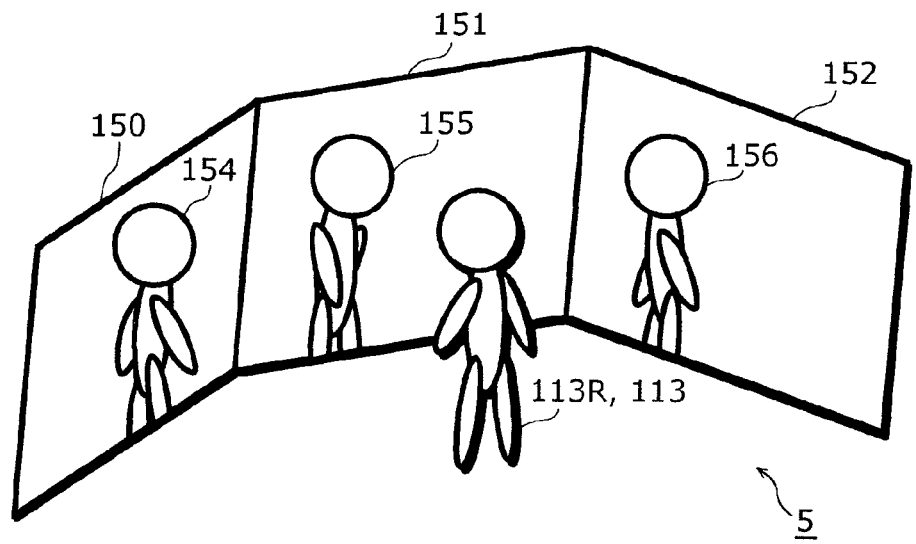
FIG. 27 is a diagram showing a three-dimensional shape measuring apparatus according to a fifth embodiment.
Figure 28:
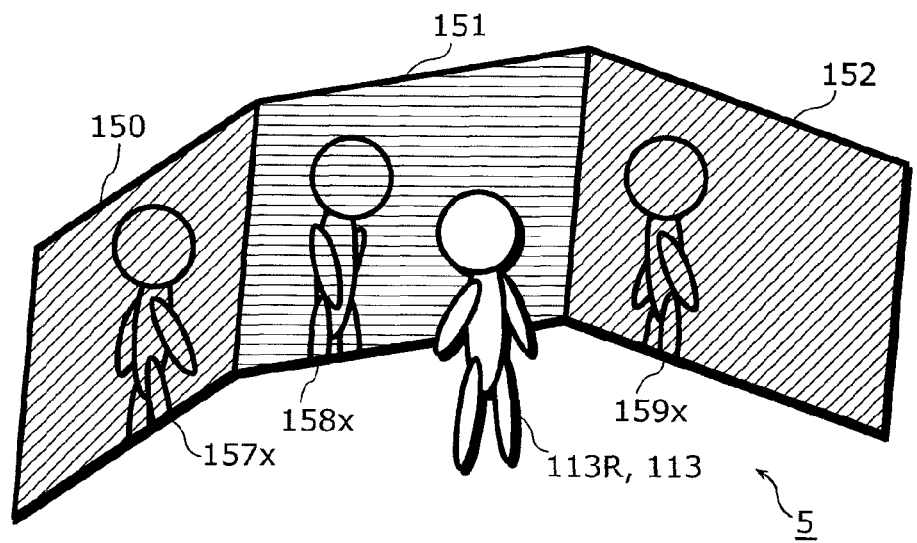
FIG. 28 is a diagram showing a three-dimensional shape measuring apparatus according to the fifth embodiment.

FIGS. 27 and 28 are diagrams showing the three-dimensional shape measuring apparatus 5 according to the fifth embodiment.

The controlled mirror determination unit 160 (FIG. 23) performs two types of control in the fifth embodiment. That is: first, the controlled mirror determination unit 106 performs control on the state shown in FIG. 27 where none of the display units 170 and so on (FIG. 24) corresponding to the mirrors 150 and so on is caused to display an image, that is, performs the same control as shown in FIG. 21. In addition, the controlled mirror determination unit 160 performs the control shown in FIG. 28. When performing the control shown in FIG. 28, the controlled mirror determination unit 160 causes the display unit 170 (FIG. 24) of the leftmost mirror 150 shown in FIG. 21 to display an image in red. In FIG. 28, a red display is shown by hatching diagonally right down. In addition, when performing the control shown in FIG. 28, the controlled mirror determination unit 160 causes the display unit 171 (FIG. 24) of the mirror 151 in the middle to display an image in blue, and causes the display unit 172 of the rightmost mirror 152 (FIG. 24) to display an image in yellow. In FIG. 28, a blue display is shown by horizontal hatching, and a yellow display is shown by hatching diagonally right up.

Note that in FIGS. 27 and 28, any two of the colors of the images displayed by the three display units are different from each other.

Then, in Step S202 (FIG. 11), the real-virtual image separating unit 105 obtains the image captured in the control state related to FIG. 28.

In addition, the real-virtual image separating unit 105 holds the image captured in the state shown in FIG. 28 and also in the state where the object 113R is not present.

Then, in Step S206, the real-virtual image separating unit 105 extracts an extracted image in the state shown in FIG. 28, from the image that is held and the obtained image shown in FIG. 28. In other words, the image extracted in Step S206 is an extracted image including: the real image 113, a virtual image 157x including red light of the image in red, a virtual image 158x including blue light, and a virtual image 159x including yellow light.

Then, in Step S207, the real-virtual image separating unit 105 specifies the real image 113 by specifying, as a real image 113, for example, a portion having a small difference from the extracted image shown in FIG. 27, which is extracted in Step S205 and included in the extracted image shown in FIG. 28.

In addition, in Step S208, the real-virtual image separating unit 105 specifies: in the extracted image shown in FIG. 28 which is extracted in Step S206, a portion including the red light as the virtual image 157x; a portion including the blue light as the virtual image 158x; and a portion including the yellow light as the virtual image 159x. Then, in Step S208, the real-virtual image separating unit 105 specifies: in the extracted image shown in FIG. 27, an image included in the specified virtual image 157x portion (FIG. 28) as the virtual image 154 (FIG. 27); an image included in the virtual image 158x portion as the virtual image 155 (FIG. 27); and an image included in the virtual image 159x portion as the virtual image 156 (FIG. 27).

The three-dimensional reconstruction unit 107 performs three-dimensional reconstruction processing and so on, using the real image 113, the virtual images 154, and so on that are thus specified by the real-virtual image separating unit 105 (Step S210).

Note that in performing this three-dimensional reconstruction processing, the three-dimensional reconstruction unit 107 may specify the color of each portion of the object 113R as the color of the portion in the real image 113.

(Variations)

(A) Note that in the first to the fourth embodiments, examples where the image capturing unit 103 includes the three image capturing apparatuses from 110 to 112 have been described, but any number of image capturing apparatuses may be used.

(B) In addition, each of the first, the fourth, and the fifth embodiments has shown a structure including the mirrors 101 and so on that transmit light, and the display units 120 and so on disposed behind the mirror (see FIG. 3). On the other hand, the structure of such mirrors and display units may vary as long as it can utilize both the reflection property of the mirror and the display property of the display unit, such as a structure including a light-transmitting display unit and a mirror disposed behind the display unit.

For example, the display unit 120 (FIG. 3) may be provided in parallel with the mirror 101 and closer to the object 113R than to the mirror 101, that is, at the surface side of the object 113R. Then, the display unit 120 may transmit the light from the object 113R such that the light arrives at the mirror and may also transmit the reflected light that has arrived and reflected off the mirror 101, toward the side at which the respective image capturing apparatuses are located. Then, the display unit 120 may also cause the image capturing apparatuses 110 and so on to capture virtual images by thus transmitting the reflected light, and may display, on the other hand, an image at the side of the image capturing apparatuses 110 and so on. With this, the display unit 120 may cause each of the image capturing apparatuses 110 and so on to capture the light of the displayed image along with the virtual image 114 formed with the reflected light. However, it is preferable that the display unit 120 described above should not display the light of the displayed image in the real image 113 region of the object 113R as seen from the image capturing apparatuses 110 and so on, by the light of the displayed image being blocked by the object 113R. That is, it is preferable that the display unit 120 should not cause the captured real image 113 to include the light of the displayed image.

Thus configured is the three-dimensional shape measuring apparatus according to the variation (B) in which: the light amount changing unit includes a display unit which displays an image so as to change the light amount of the virtual image by using the light of the displayed image (the light amount changing unit is the display unit), and the display unit transmits the light from the object, toward the mirror portion, and also retransmits the light which proceeds to the image capturing unit after transmitted and reflected by the mirror portion.

Each of the three-dimensional shape measuring apparatuses described above may have an aspect of a three-dimensional shape measuring apparatus related to another embodiment as described below.

(A) Specifically, the three-dimensional shape measuring apparatus according to another embodiment (three-dimensional shape measuring apparatus 1) includes an object image specifying unit (device) and a three-dimensional shape calculating unit. The object image specifying unit includes a mirror, an image capturing unit, and a first color changing unit, and an image capturing control unit, and a specifying unit. The mirror reflects a virtual image (virtual images 114 and 115) of the object 113R (mirror 101). The image capturing unit captures a captured image (FIGS. 8 and 9) including both the virtual image reflected in the mirror and the real image 113 of the object. The first color changing unit changes the color of one of the virtual and the real images in the middle of a light path of the one of the images (display unit 120, mirror shielding unit 130, and light irradiation unit 140). The image capturing control unit causes each image capturing unit to capture a first captured image (FIG. 8) in which the color of one of the images has been changed by the first color changing unit, and a second captured image (FIG. 5) in which the color is not changed (real-virtual image separating unit 105). The specifying unit specifies, as a first image of the object, a portion of which the color is not changed (real image 113 portion) and which is included in the first and the second captured images, and also specifies a portion of which the color is changed (virtual image 114 portion) as a second image of the object (real-virtual image separating unit 105).

The three-dimensional shape calculating unit calculates a three-dimensional shape of the object from the first and the second images specified by (the specifying unit included in) the object image specifying unit (three-dimensional reconstruction unit 107).

As a result, for example, in the light-section method, no complicated processing is necessary, such as slit-beam irradiation or capturing of the positional relationship of slit beams on the object using cameras. That is, it is possible to easily calculate a three-dimensional shape. Moreover, since this allows reducing an amount of time between the capturing of the first captured image and the capturing of the second captured image as compared to the processing time for capturing the positional relationship using cameras, it is possible to perform the image capturing within a short time even when the object is moving. With this, it is possible to remove motion between the captured images of the object and calculate a three-dimensional shape even when the object is moving. That is, this allows easy calculation, and further allows calculating a three-dimensional shape even when the object is moving.

(B) Furthermore, more specifically, the three-dimensional shape measuring apparatus according to another embodiment has the following configuration.

That is, the first color changing unit changes the color of the light of the virtual image in a light path of the virtual image.

For this purpose, the first color changing unit (display unit 120, mirror shielding unit 130, and light irradiation unit 140) is provided near the mirror that reflects the virtual image. With this, the positions of the first color changing unit and the other portions of the three-dimensional shape measuring apparatus become closer, thus reducing the size of the three-dimensional shape measuring apparatus.

Then, the specifying unit specifies, as the real image of the object, a portion of which the color is not changed and which is included in the first and the second captured images, and also specifies, as the virtual image of the object, a portion of which the color is changed. Then, the three-dimensional shape calculating unit holds an image capturing position and an image capturing direction from which the image capturing unit performs capturing, and a mirror position and a mirror direction of the mirror. Then, the three-dimensional shape calculating unit calculates a three-dimensional shape based on each of the real and virtual images that have been specified, and the image capturing position, the mirror position, and the mirror direction that are held. In other words, the three-dimensional shape calculating unit calculates the next three-dimensional shape. In the three-dimensional shape that is to be calculated, the real image is captured from the image capturing position and the image capturing direction, and also a reverse image as a result of reversing the virtual image is captured from the virtual image capturing position and the virtual image capturing direction that are plane-symmetrical to the image capturing position and the image capturing direction, respectively, with respect to the mirror having the mirror position and the mirror direction. The three-dimensional shape calculating unit calculates this three-dimensional shape as the three-dimensional shape of the object.

Thus, for example, it is possible to calculate a three-dimensional shape more easily and more accurately than in the case of performing calculation, simply using the analysis of the respective captured images without using the image capturing position or the image capturing direction. Note that such a three-dimensional shape calculating unit may be, for example, a functional block in which various known techniques are used.

Note that the three-dimensional shape calculating unit may hold the image capturing position and the image capturing direction of the virtual image capturing unit, to thereby hold the mirror position and the mirror direction. Here, the mirror position and the mirror direction are specified according to the virtual image capturing position and so on and the image capturing position and so on of the real image capturing unit.

In addition, more specifically, in a three-dimensional shape reconstructed according to another embodiment, the first color changing unit, for example, may have one of the following configurations.

(B1) For example, the first color changing unit may change the color of the virtual image by displaying an image on the reflection surface of the mirror and adding the light of the displayed image to the light of the virtual image.

In this case, it is possible to cause the change using a simple structure, without a mechanical structure such as a movable shielding unit that blocks light. In addition, for example, simply by displaying an image uniformly on the reflection surface, it is possible to uniformly change the color of each portion of the virtual image, thus allowing specifying the virtual image accurately and easily. With this, it is possible to specify the virtual image accurately using a simple structure.

(B11) Here, for example, the mirror may transmit, to the surface side, the light proceeding to the mirror from the reverse face side opposite to the surface side at which the object is present. In addition, the first color changing unit may be provided at the reverse face side of the mirror, and may display the image on the mirror surface, using the light of the displayed image transmitted to the surface, by displaying the image from the reverse face side to the mirror surface side (see the display unit 120 in FIG. 3, and so on). In this case, for example, the first color changing unit provided on the mirror surface suppresses the degradation of the light of the virtual image. This allows capturing of a captured image which is more accurate without degradation.

(B12) In addition, for example, the first color changing unit may be provided on the mirror surface and display the image on the surface. In addition, the first color changing unit may transmit, toward the mirror, the light proceeding from the object to the mirror, and may also retransmit the light transmitted and reflected by the mirror, to cause the retransmitted light to be captured by the image capturing unit.

In this case, for example, the mirror configuration has no constraints such as the necessity for the function to transmit the light from the reverse face to the surface, thus allowing a free mirror structure.

(B2) In addition, for example, the first color changing unit may shield the mirror against the object. That is, the first color changing unit may block at least part of the light from the object from arriving at the mirror (see the mirror shielding unit 130 in FIGS. 12 and 13, and so on).

In this case, since the color of the virtual image is changed due to the physical blocking, the color of the virtual image can be changed sufficiently and reliably.

(B3) In addition, for example, the first color changing unit may decrease only the contrast of the light of the virtual image by irradiating only the light path of the virtual image with light, among two light paths of the virtual and the real images (see the light irradiation unit 140 in FIGS. 17 and 18, and so on).

In this case, the first color changing unit is provided at a position for irradiating the middle of the light path with light, thus allowing free selection of the position and the size of the first color changing unit irrespective of the positional relationship between the first color changing unit and the mirror or the object. That is, the first color changing unit can be freely configured. In addition, it is possible to accurately change the light of the virtual image by simply making the light irradiation range larger than the virtual image. Thus, it is possible to reduce the size of the color changing unit while at the same time changing the color accurately. In addition, this allows a simple configuration of the color changing unit as a result of, for example, not requiring a mechanically-functioning movable unit.

Note that the color changing unit may change the virtual image through light irradiation, by causing the virtual image to include the light that is irradiated and scattered.

(C) Then, in the three-dimensional shape measuring apparatus according to another embodiment, specifically, for example, the specifying unit may hold a held captured image (FIG. 6) in which the object is not present and which is held in the state where the first color changing unit does not change the color. Then, the specifying unit may perform processing based on a synthesized image (FIG. 7) which is composed of the real and virtual images and is obtained in the state where the color is not changed, by removing the held captured image (FIG. 6) from the second captured image (FIG. 5) that is captured. That is, the specifying unit may specify, as the real image (real image 113), the same portion as the first captured image that is captured (FIG. 8), in the synthesized image, and also may specify, as the virtual image (virtual image 114), the remaining portion except the specified real image (real image 113), in the synthesized image (FIG. 7).

Thus, for example, this method is more appropriate than in the case of specifying the real image and so on using complicated image processing without holding the captured images. That is, it is possible to specify the images, using previously-prepared information on the held captured images.

(D) Note that a variation of the three-dimensional shape measuring apparatus according to another embodiment will be described.

The three-dimensional shape measuring apparatus according to the variation of another embodiment further includes a second mirror (for example, the mirror 151) which reflects a second virtual image of the object (for example, the virtual image 155, and the virtual image 158 (FIGS. 21 and 22, and FIGS. 25 and 26), and a second color changing unit. Then, the image capturing unit captures a captured image (FIG. 21 and so on) including both the first virtual image (virtual image 154), the second virtual image (virtual image 155, and so on), and the real image (real image 113). Then, the second color changing unit changes the color of the second virtual image in the middle of the light path of the second virtual image (display unit 171 in FIG. 24). Then, the image capturing control unit causes the second color changing unit to change the color only in the capturing of the first captured image (the image capturing shown in FIG. 22), among the first captured image (for example, the image shown in FIG. 21) and the second captured image (for example, the image shown in FIG. 22), and causes the second color changing unit not to change the color in the capturing of the other image (the image capturing shown in FIG. 21). Then, the image capturing control unit causes the image capturing unit to capture a third captured image (for example, the image shown in FIG. 25), and in the capturing of the third captured image, causes the first color changing unit not to change the color and also causes the second color changing unit to change the color.

Then, the specifying unit may specify, as the real image, a portion of which the color is not changed (real image 113 portion) in the first and the second captured images that have been captured. Then, the specifying unit specifies, in the second captured image (the image shown in FIG. 21), as the second virtual image (virtual image 155), a portion which is included in a portion other than the specified real image (virtual image 154, and virtual image 155) and of which the color is changed (virtual image 155 portion) in the third captured image (FIG. 25). Then, the specifying unit specifies, as the first virtual image, the virtual image (virtual image 154) other than the specified second virtual image.

In this case, it is possible to obtain images from three different capturing positions, using a simple structure including the second mirror only, without increasing the number of capturing positions.

In addition, such inclusion of the second mirror makes it possible to specify the three images of the object by simple processing in which only the third captured image is captured in spite of the second virtual image being included in the captured image.

The description will further continue as follows.

Figure 29:
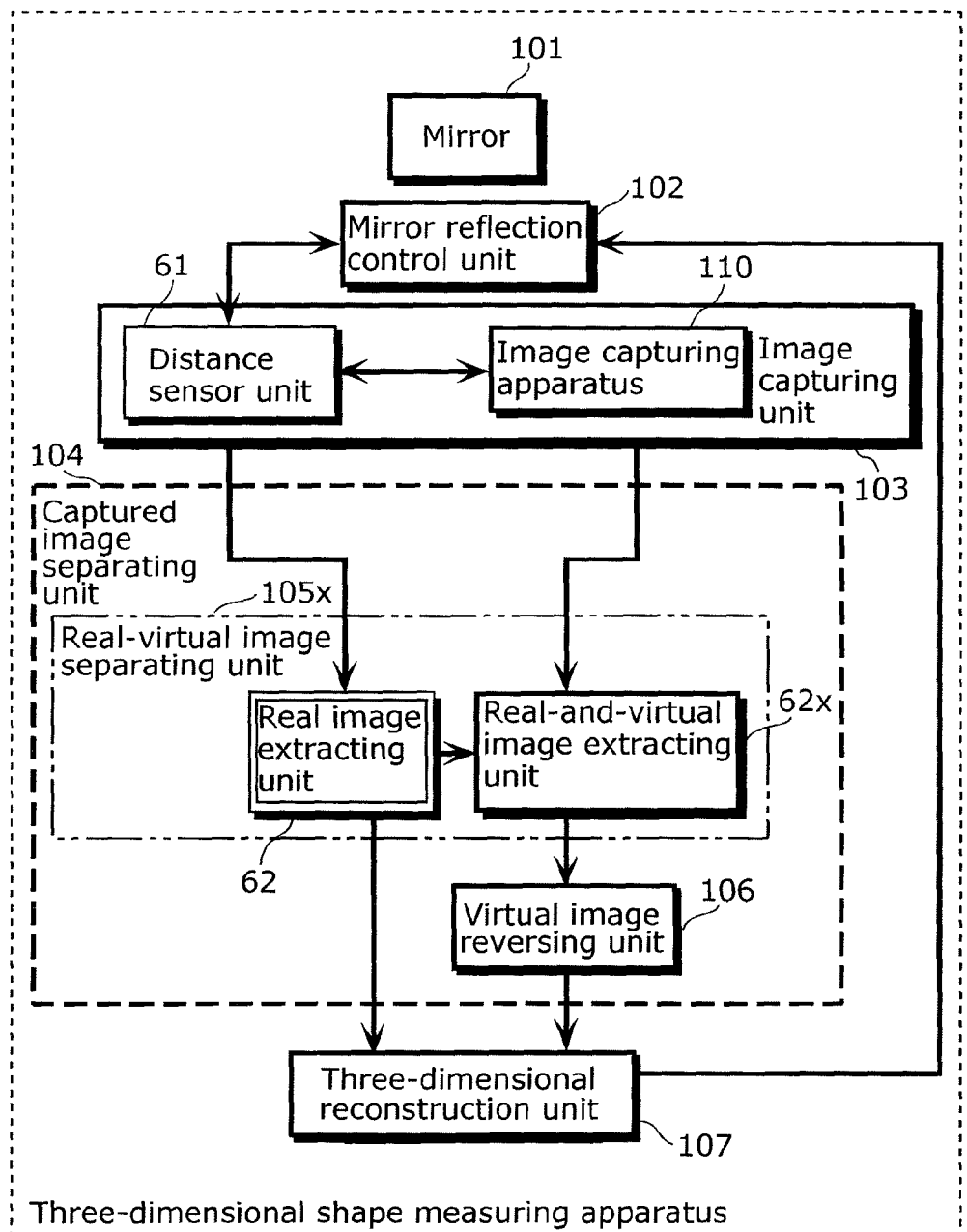
FIG. 29 is a diagram showing a configuration of a three-dimensional shape measuring apparatus.

FIG. 29 is a diagram showing a configuration of a three-dimensional shape measuring apparatus 6.

Figure 30:
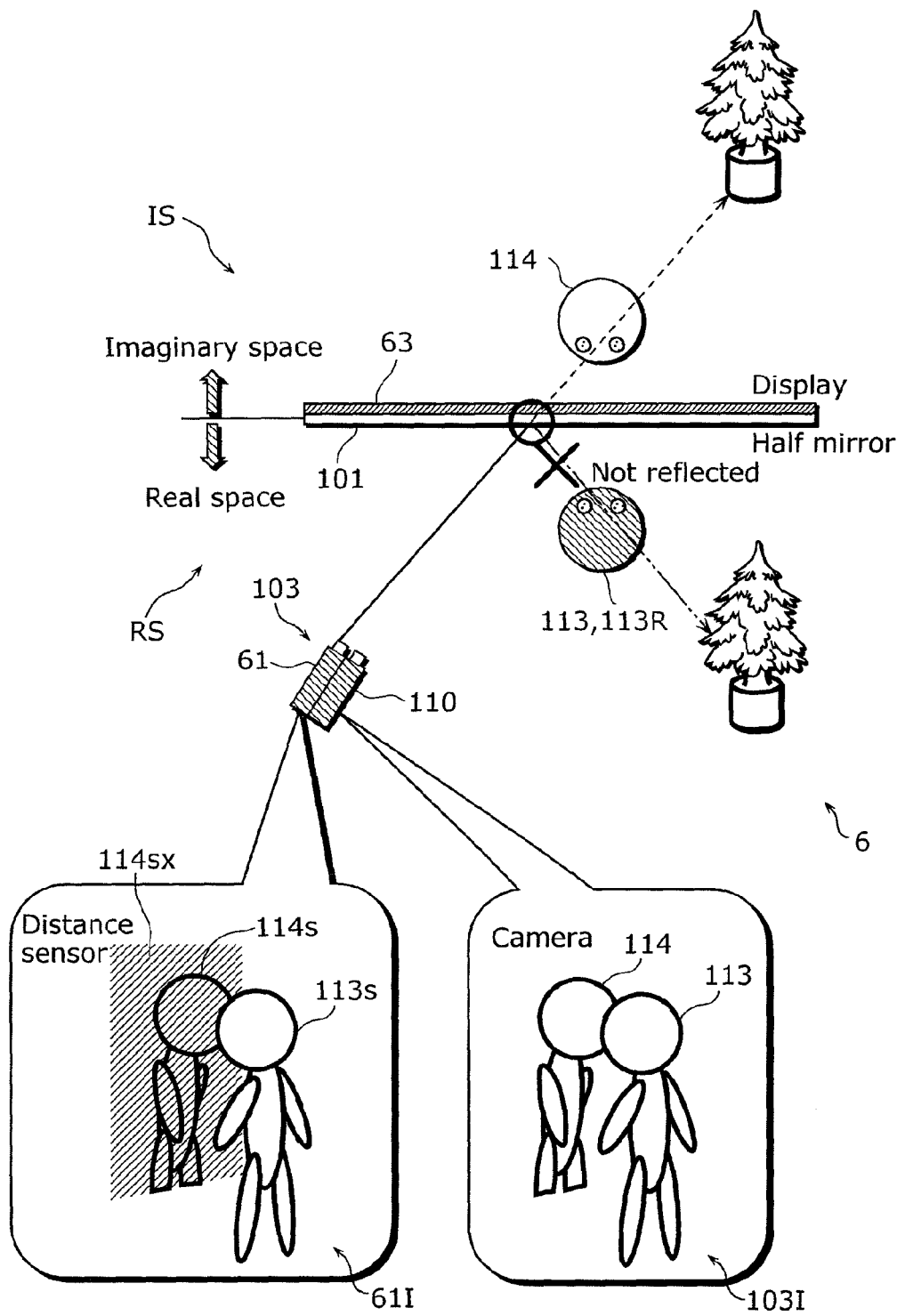
FIG. 30 is a diagram showing a positional relationship between plural portions such as a mirror included in a three-dimensional shape measuring apparatus.

FIG. 30 is a diagram showing a positional relationship between plural portions included in the three-dimensional shape measuring apparatus 6.

The three-dimensional shape measuring apparatus 6 includes: the mirror 101, the mirror reflection control unit 102, the image capturing unit 103, a real-virtual image separating unit 105x, the virtual image reversing unit 106, and the three-dimensional reconstruction unit 107. The mirror 101 and so on correspond to the mirror 101 and so on shown in FIG. 2, respectively. In the description below, the detailed description of the points described earlier will be omitted accordingly.

The mirror 101 reflects the light from the object 113R, and forms the virtual image 114 with the reflected light. The position and the direction of the mirror 101 are the position and the direction in which the object 113R is located at the side of the mirror 101 surface on which the mirror 101 reflects the light. The mirror 101 is a half mirror which transmits, toward the mirror surface side, the light proceeding to the mirror 101 from the side of the reverse face opposite to the mirror surface.

The mirror reflection control unit 102 (FIG. 29) includes a display unit 63 (FIG. 30).

The display unit 63 is a display which is provided at the reverse face side of the mirror 101 and irradiates the mirror 101 side with light having a predetermined specific wavelength (light having a specific color). The display unit 63 transmits the irradiated light toward the surface side of the mirror 101 so as to cause the light to be displayed at the surface side of the mirror 101. For example, the display unit 63 causes the transmitted light to be displayed in all the regions on the surface of the mirror 101.

The image capturing unit 103 includes an image capturing apparatus 110 and a distance sensor unit 61. Note that the distance sensor unit 61, for example, is one of distance sensor units included in the image capturing unit 103. In addition, the image capturing apparatus 110 is one of the image capturing apparatuses included in the image capturing unit 103. For example, each of the distance sensor units corresponds to one of the image capturing apparatuses. In addition, the positions of the corresponding distance sensor unit and image capturing apparatus are the same.

Figure 31:
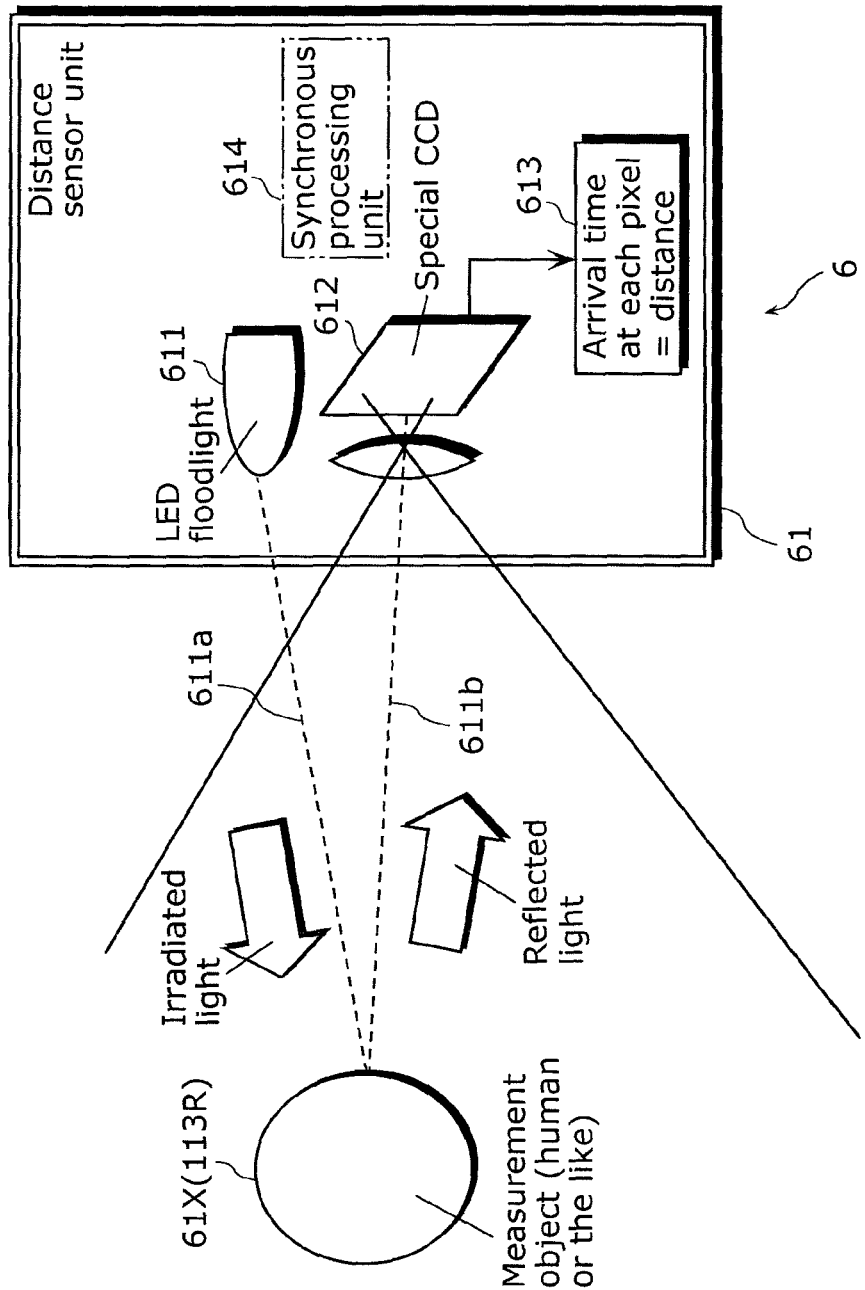
FIG. 31 is a diagram showing a detailed configuration of a distance sensor unit.

FIG. 31 is a diagram showing a detailed configuration of the distance sensor unit 61.

The distance sensor unit 61 includes a special charge coupled device (CCD) 612, a specifying unit 613, a synchronous processing unit 614, and an LED floodlight 611.

The synchronous processing unit 614, for example, causes the distance sensor unit 61 to operate when the display unit 63 performs display by obtaining a signal indicating that the display unit 63 is to perform the display and causing the distance sensor unit 61 to operate upon the obtainment of the signal.

The LED floodlight 611 emits light having a specific wavelength. Note that the specific wavelength may be, for example, an infrared wavelength. In addition, the specific wavelength may be, for example, an ultraviolet wavelength, or may be part of wavelengths of visible light. Then, more specifically, the LED flood light 611 emits light that varies in a predetermined pattern during a predetermined irradiation time. This point will be described in detail below. Note that the LED floodlight 611 performs this emission when the synchronous processing unit 614 operates the distance sensor unit 61 in synchronization with the display by the display unit 63.

The special CCD 612 senses the light that is irradiated by the LED floodlight 611 and then reflected by a measurement object 61X (object 113R), and measures arrival time for each pixel. That is, the special CCD 612 senses, at each pixel, the light which is irradiated and has arrived at the pixel and which varies with a specific wavelength in a predetermined pattern. Here, the light sensed at each pixel is light proceeding from a point through which the light has arrived at the pixel, among points in the object 113R.

The specifying unit 613 specifies the time at which the light from the LED floodlight 611 is sensed at each pixel. The specifying unit 613 specifies, for each pixel, a duration (arrival time) from a time at which the light was irradiated by the floodlight LED 611 to a time at which the light is detected at the pixel. The specifying unit 613 specifies the distance that the light travels during the arrival time, and the distance between the distance sensor unit 61 and a measurement point corresponding to the pixel at which the light is detected, based on the specified arrival time. Note that, specifically, the distance that the light travels during the arrival time is a double distance that is a sum of out and return distances traveled by the light. Thus, for example, the specifying unit 613 specifies half the distance traveled during the arrival time as the distance up to the point.

Thus, the specifying unit 613 specifies the distance for each pixel. With this, the specifying unit 613 specifies a distance image (a first image) 61I (FIG. 30), in which the value of each pixel is equivalent to the specified distance of the pixel.

Here, in the distance image 61I, the pixel in a region 114sx on which the display unit 63 performs display (irradiation) is, for example, a pixel having a zero amount of light having the pattern described above. The above pattern observed in the light of the region 114sx, for example, is absorbed by the light of the display unit 63, to be offset by the light by the display unit 63. With this, the light amount of the light having the pattern above becomes zero. Thus, the display unit 63 offsets the pattern described above by light irradiation so that the light having the pattern is not reflected by the mirror 101.

The specifying unit 613 specifies an infinite distance by specifying, for example, an infinite length of time for the pixel of the region 114sx displayed by the display unit 63. Thus, a pixel in the irradiated region 114sx in the distance image 61I is a pixel having an infinite distance. In addition, a pixel in an unirradiated region is a pixel having a limited distance.

The specifying unit 613 specifies the region included in the distance image 61I and including the pixel specified as having an infinite distance, as the region 114sx irradiated by the display unit 63 with the light having a specific wavelength, by specifying the distance image 61I, and specifies the region including a pixel having a limited distance as the unirradiated region.

In more detail, the real-virtual image separating unit 105x includes a real image extracting unit 62 and a real-and-virtual image extracting unit 62x.

The real image extracting unit 62 specifies a real image region 113s based on the distance image 61I. For example, the real image extracting unit 62 previously holds a predetermined reference image, and specifies, as the real image region 113s, a region having a difference from the reference image that is held, in the distance image 61I. Then, the real image extracting unit 62 specifies, as the real image 113, a portion in the specified real image region 113s in the image (the second image) 103I captured by the image capturing apparatus 110. That is, the real image extracting unit 62 specifies the real image 113 included in the image 103I, by comparing shapes of the distance image 61I and the image 103I. In other words, for example, the real image extracting unit 62 specifies a shape in the image 103I corresponding to the shape of the real image region 113s, and specifies a portion having the specified shape in the image 103I as the real image 113. Note that the specified real image region 113s is a region having a limited distance specified by the specifying unit 613.

Note that the special CCD 612 thus senses the light, and the specifying unit 613 specifies the distance image 61I, and thereby the distance image 61I is captured by the distance sensor unit 61.

The real-and-virtual image extracting unit 62x specifies the virtual image 114 in the image 103I captured by the image capturing apparatus 110, based on the real image region 113s specified by the real image extracting unit 62. Specifically, for example, the real-and-virtual image extracting unit 62x specifies, as entirety including the real image 113 and the virtual image 114, a portion in the image 103I in which the image 103I has a difference from the predetermined reference image, and specifies, as the virtual image 114, a portion that is a region other than the real image region 113s specified by the real image extracting unit 62, in the specified entirety. Note that the real-and-virtual image extracting unit 62x specifies a virtual image region 114s by thus specifying the virtual image 114. Note that the virtual image region 114s specified here is a region having a limited distance specified by the specification unit 613, in the distance image 61I.

The three-dimensional reconstruction unit 107 calculates, as a three-dimensional shape of the object 113R, a three-dimensional shape for causing the specified real image 113 and the specified virtual image 114 to be captured in the image 103I, based on the specified real image 113 and the specified virtual image 114. The three-dimensional reconstruction unit 107, for example, displays the calculated three-dimensional shape to the user, using a predetermined display control unit.

Note that in the three-dimensional shape measuring apparatus 6, the pixel in the region 114sx on which the display unit 63 performs display (irradiation) may be the pixel as follows. For example, the light resulting from the display performed by the display unit 63 has the same pattern as the above (the light having the same pattern). Then, the display in the display unit 63 emits the light having the same pattern at the same time as or earlier than the time at which the LED flood light 611 performs irradiation. Then, at the pixel in the irradiated region 114sx, the display unit 63 senses the light described above at the same time (an approximate time) as the time of the irradiation. For example, the pixel in the irradiated region 114sx is a pixel having a zero amount of time until the special CCD 612 senses the light. In this case, the distance of the pixel corresponding to the irradiated region in the distance image 61I is zero or a value near zero. In addition, in this case, the specifying unit 613 specifies, by specifying the distance image 61I, a region including a pixel having a near-zero distance in the distance picture 61I as the region 114sx irradiated with the light having a specific wavelength by the display unit 63, and specifies a region including a distance that cannot be approximated to zero as the unirradiated region. In addition, in this case, the real image region 113s specified by the real image extracting unit 62 is a region specified by the specifying unit 613 as having a distance that cannot be approximated to zero.

Figure 32:
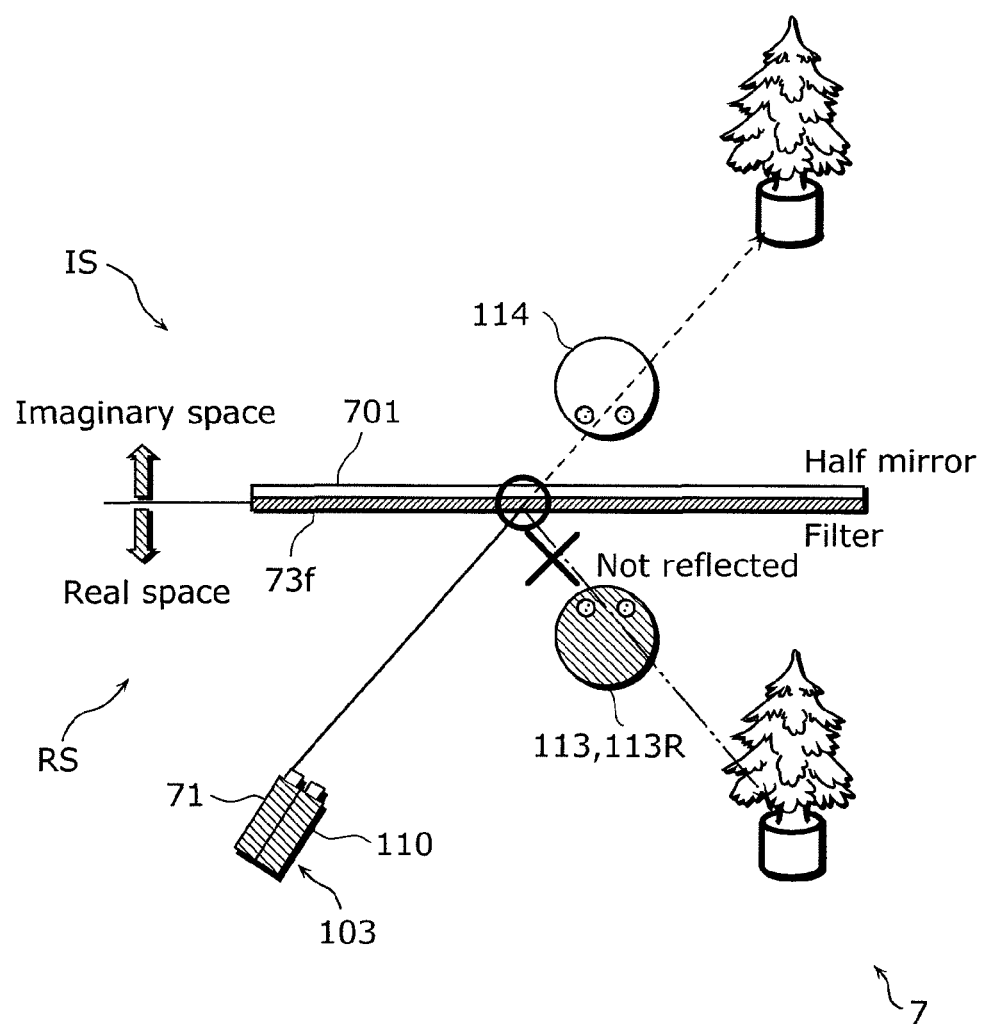
FIG. 32 is a diagram showing a three-dimensional shape measuring apparatus that is a variation.

FIG. 32 is a diagram showing a configuration of a three-dimensional shape measuring apparatus 7 which is a variation of the three-dimensional shape measuring apparatus 6.

The three-dimensional shape measuring apparatus 7 includes a mirror 701, a light amount changing unit 73f, and a distance sensor unit 71.

The mirror 701 need not be a half mirror. That is, the mirror 701 need not transmit the light from the reverse face side.

The light amount changing unit 73f is a filter provided at the surface side of the mirror 101. The light amount changing unit 73f does not transmit but blocks the light having the predetermined wavelength as described above, in the light passing through a light path between the object 113R and the image capturing unit 103 (the distance sensor unit 71 and the image capturing apparatus 110). On the other hand, the light amount changing unit 73f transmits the light having a wavelength other than the specific wavelength described above. The light amount changing unit 73f is provided, for example, on the entire surface on which the mirror 701 reflects the light at the mirror 701 surface side.

The image capturing apparatus 110 captures the image 103I at the same time when the distance sensor unit 71 captures the distance image 61I (when the special CCD 612 detects the light). The image capturing apparatus 110 captures the image 103I formed with light including light other than the light having the predetermined wavelength described above. Thus, in spite of having the light amount changed by the light amount changing unit 73f, the captured image 103I has a small difference from the image that is captured when the light amount is not changed. The image 103I is, for example, identical (substantially identical) to the image having no change. That is, the image 103I to be captured is identical (substantially identical) to the image 103I captured by the three-dimensional shape measuring apparatus 6 described earlier.

The specifying unit 613 specifies the region (region 114sx in FIG. 30) having the light amount changed by the light amount changing unit 73f, by specifying the region having an infinite distance. The distance sensor unit 61 need not include the synchronous processing unit 614.

With this three-dimensional shape measuring apparatus 7, an appropriate image is captured as the image 103I and appropriate processing is performed, in spite of the fact that the distance image 61I and the image 103I are captured at the same time. With this, it is possible to obtain two appropriate images easily, without complicated processing for capturing the two images at different times. With this, it is possible to easily perform appropriate processing.

Figure 33:
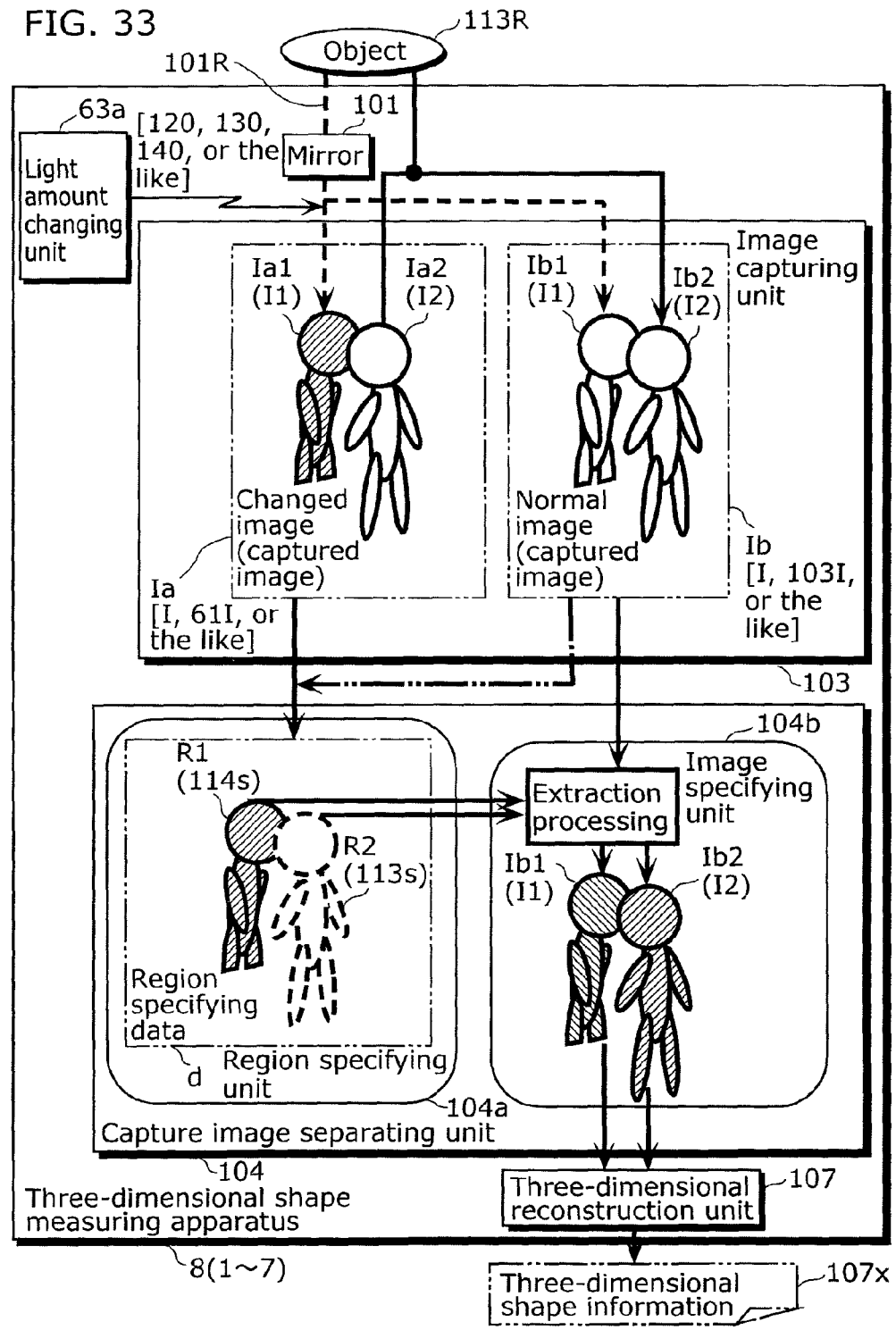
FIG. 33 is a diagram showing a three-dimensional shape measuring apparatus.

FIG. 33 is a diagram showing a three-dimensional shape measuring apparatus 8 (three-dimensional shape measuring apparatuses 1 to 7). The three-dimensional shape measuring apparatus 8, for example, is the three-dimensional shape measuring apparatus 6 described earlier.

The three-dimensional shape measuring apparatus 8 includes the mirror 101 (mirror 150 and so on), the light amount changing unit 63a (display unit 120, mirror shielding unit 130, light irradiation unit 140, display 63, or light amount changing unit 73f), and the image capturing unit 103, the captured image separating unit 104, and the three-dimensional reconstruction unit 107.

The mirror 101 causes the image capturing unit 103 to capture the reflected light by reflecting the light from the object 113R. With this, the mirror 101 forms a light path 101R via the mirror 101, between the object 113R and the image capturing unit 103. The mirror 101 forms the virtual image I1 of the object 113R by the reflection of the light in the light path 101R.

The light amount changing unit 63*a* changes the light amount of the light proceeding in the light path 101R by influencing the light in the light path 101R.

The image capturing unit 103 captures a captured image I including both the virtual image I1 formed by the mirror 101 and the real image I2 that is not formed by the mirror 101. The image capturing unit 103 captures a changed image Ia influenced by the change caused by the light amount changing unit 63*a* as a first captured image I. In addition, the image capturing unit 103 captures a normal image Ib not influenced by the change caused by the light amount changing unit 63*a* as the second captured image I. The image capturing unit 103 captures each of the changed image Ia and the normal image Ib.

Specifically, the image capturing unit 103, for example, captures the changed image Ia (the image shown in FIG. 5 and so on) at a first time when the light amount changing unit 63*a* changes the light amount. Then, the image capturing unit 103, for example, captures the normal image Ib (the image shown in FIG. 8 and so on) at a second time when the light changing unit 63*a* does not change the light amount. Here the second time is different from the first time.

In addition, specifically, the image capturing unit 103 includes, for example, a first image capturing apparatus (distance sensor unit 61) which captures the changed image Ia that is influenced (the first image 61I), and a second image capturing apparatus (image capturing apparatus 110 and so on) which captures the normal image Ib that is not influenced. Here, not being influenced means, for example, being influenced less than the changed image Ia. In addition, not being influenced means, for example, being influenced less than a predetermined level.

The virtual image Ia1 included in the changed image Ia is influenced by the change in light amount caused by the light amount changing unit 63*a*.

The virtual image Ia2 included in the changed image Ia is not influenced by the change in light amount caused by the light amount changing unit 63*a*.

The captured image separating unit 104 includes a region specifying unit 104*a* and an image specifying unit 104*b*. These region specifying unit 104*a* and so on are not illustrated in FIG. 29 and so on, for the sake of convenience in the description.

The region specifying unit 104*a* specifies, based on the changed image Ia, a region included in the changed image Ia and influenced by the change in the light amount as a virtual image region R1 (virtual image region 114*s*, virtual image region 115 in FIG. 10, and so on), and specifies a region included in the changed image Ia and not influenced by the change in the light amount as a real image region R2 (real image region 113*s*, real image region 113 in FIG. 10, and so on).

Note that specifically the region specifying unit 104*a* may perform such specification, for example, based on both the changed image Ia and the normal image Ib. For the virtual image region R1, an image in the region in the changed image Ia is a virtual image Ia1 that is influenced, and an image in the region in the normal image Ib is a virtual image Ib1 that is not influenced. Thus, for example, the region specifying unit 104*a* may specify, as the virtual region R1, regions that are different between these two images in terms of whether or not being influenced. On the other hand, for the real image region R2, an image in the region in the changed image Ia is a real image Ia2 that is not influenced, and an image in the region in the normal image Ib is also a real image Ib2 that is not influenced. Thus, the region specifying unit 104*a*, for example, may specify, as the real image region R2, the regions equivalent to each other between these two images in terms of whether or not being influenced.

Note that more specifically, the region specifying unit 104*a* specifies these regions by, for example, generating region specifying data d for specifying the virtual image region Ia1 and the real image region Ia2.

In addition, specifically, the region specifying unit 104*a* may specify the virtual image region R1 and the real image region R2, based on, for example, only the changed image Ia. With this, it is sufficient to use the changed image Ia having a lower quality, such as an image having resolution lower than the resolution used for the three-dimensional reconstruction. For example, the changed image Ia is an image captured by the image capturing unit 103, using the distance sensor unit 61 (distance sensor 71) included in the image capturing unit 103.

The image specifying unit 104*b* specifies, as the virtual image Ib1, the image that is in the virtual image region R1 in the normal image Ib and is specified by the region specifying unit 104*a*. In addition, the image specifying unit 104*b* specifies, as the real image Ib2, in the normal image Ib, the image that is in the real image region R2 in the normal image Ib and specified by the region specifying unit 104*a*.

Note that the real image Ib2 in the normal image Ib may be identical to the real image Ia2 in the changed image Ia. For example, the changed image Ia may have an image (real image 113 in FIG. 10) identical to the image in the region in the normal image Ib (real image 113 in FIG. 17), in a region other than a portion including the virtual image Ia1 influenced by the light amount changing unit 63*a* (for example, the real image 113 region in FIG. 10). In this case, for example, the image specifying unit 104*b* may specify the image (real image Ia2) in the specified real image region R2 in the changed image Ia as the real image Ib2 in the normal image Ib.

The three-dimensional reconstruction unit 107 calculates, as the three-dimensional shape of the object 113R, a three-dimensional shape from the virtual image Ib1 and the real image Ib2 that have been specified by the image specifying unit 104*b* and which the image capturing unit 103 is caused to capture. The three-dimensional reconstruction unit 107, for example, generates three-dimensional shape information 107*x* for identifying the calculated three-dimensional shape. Then, for example, the three-dimensional reconstruction unit 107 displays the generated three-dimensional shape information 107*x* to the user, using a predetermined display unit.

Thus, the three-dimensional shape measuring apparatus according to the embodiments (three-dimensional shape measuring apparatus 8 and three-dimensional shape measuring apparatuses 1 to 7) measures the three-dimensional shape of the object (object 113R). The mirror (mirror 101) reflects the light from the object. The image capturing unit (image capturing unit 103) captures a captured image (captured image I) including both the real image (real image I2) of the object and the virtual image (virtual image I1) of the object, which is formed by the mirror. The light amount changing unit (light amount changing unit 63*a*) changes the light amount of one (virtual image I1) of the real and virtual images. The image separating unit (captured image separating unit 104) specifies, as the one (virtual image Ib1) of the real and the virtual images, a portion which has a different light amount (virtual image region R1 portion in the normal image Ib) and which is included in the first captured image (changed image Ia) influenced by the change caused by the light amount changing unit and the second captured image (normal image Ib) that is not influenced, and specifies a portion having the same light amount (real image region R2 portion in the normal image Ib) as the other image (real image Ib2). The reconstruction unit reconstructs the three-dimensional shape of the object, using the real and the virtual images that have been specified by the image separating unit (generates the three-dimensional shape information 107x).

For example, the light amount changing unit changes the light amount of the light having a predetermined color (the light having a predetermined wavelength); the image capturing unit includes a first image capturing apparatus (distance sensor unit 61) and a second image capturing apparatus (image capturing apparatus 110 or the like); the first image capturing apparatus performs distance measurement using only the light having the predetermined color and captures, as the first captured image (first image 61I), the image obtained as a result (distance image), and captures, as the second captured image (second image 103I), the captured image formed with light including light having a color other than the predetermined color of the light; and the image separating unit specifies, as the virtual image (virtual image I1) region, the region which has the light amount or the distance changed and which is included in the first captured image, and specifies, as the virtual image (virtual image I1), a portion corresponding to the specified region in the second captured image, and also specifies, as the real image (real image I2), a portion other than the specified portion in the second captured image. The first image capturing apparatus includes: an irradiation unit (LED floodlight 611) which irradiates light having the predetermined color; an image capturing unit (special CCD 612) which senses (captures) light irradiated and reflected at each point in the object; a calculating unit (specifying unit 613) which calculates the distance that the light travels during a period between the time at which the light is irradiated and the time at which the light is captured at each point, as the distance from the first image capturing unit to the point.

For example, the mirror (mirror 101 included in the three-dimensional shape measuring apparatus 6) transmits, toward the surface side, the light proceeding to the mirror from the side of the reverse face opposite to the surface that reflects the light from the object, and the light amount changing unit is a display unit (display unit 63 in FIG. 30) which is provided at the reverse face side of the object and which displays the light having the predetermined color to the mirror side when the first captured image is captured by the first image capturing unit.

For example, the light amount changing unit (light amount changing unit 73f in FIG. 32) is provided at the side of the mirror surface on which the mirror reflects the light from the object, and is a filter which does not transmit the light included in the light of the virtual image and having the predetermined color while on the other hand transmitting light having a color other than the predetermined color.

In addition, the following computer program is configured. The computer program is a computer program for causing a computer that measures the three-dimensional shape of the object (all or part of the three-dimensional shape measuring apparatus, for example, the control unit 1A or CPU1Aa) to perform the measurement. Here, the three-dimensional shape measuring apparatus includes a mirror which reflects the light from the object, and an image capturing unit which captures a captured image including both the real image of the object and the virtual image of the object, which is formed by the mirror. The computer program is a computer program which causes the computer to realize, for example: an image capturing control unit which controls performance of the image capturing; a light amount change control unit which controls the light amount changing unit to change the light amount of one of the real and the virtual images; an image separating unit which specifies, as the one of the real and the virtual images, a portion which has a different light amount and is included in the first captured image influenced by the change caused by the light amount changing unit and the second captured image that is not influenced, and specifies a portion having the same light amount as the other image; and a reconstruction unit which reconstructs the three-dimensional shape of the object, using the virtual and the real images that have been specified by the image separating unit.

Note that each of the matters described above may be combined, where appropriate, with another matter described in a part other than the part in which the matter is described, and a configuration using such combined embodiments may be allowed.

INDUSTRIAL APPLICABILITY

A three-dimensional shape measuring apparatus according to the present invention readily performs three-dimensional reconstruction of an object and has a function to display a result thereof, and is useful as a health management system used for maintenance of a body shape and so on. In addition, the apparatus is useful for purposes such as a fitting system.

REFERENCE SIGNS LIST 1 to 8 Three-dimensional shape measuring apparatus
1A Control unit
61, 71 Distance sensor unit
61I, 103I Image
62 Real image extracting unit
62x Real-and-virtual image extracting unit
63, 120, 131, 170 to 172 Display unit
63a, 73f Light amount changing unit
101, 150 to 152, 701 Mirror
101R Light path
102 132, 142, 162 Mirror reflection control unit
103 Image capturing unit
104 Captured image separating unit
104a Region specifying unit
104b Image specifying unit
105, 105x Real-virtual image separating unit
106 Virtual image reversing unit
107 Three-dimensional reconstruction unit
110 to 112 Image capturing apparatus
113R Object
114s, 114sx, R1, R2 Region
120 Display unit
121 Synchronization control unit
130 Mirror shielding unit
140 Light irradiation unit
160 Controlled mirror determination unit
210 to 212 Virtual image capturing apparatus
611a Irradiated light
611b Reflected light
d Region specifying data
I Captured image
I1, Ia1, Ib1, 114, 115, 144, 154 to 159 Virtual image
I2, Ia2, Ib2, 113 Real image
Ia Changed image Ib Normal image
IS Imaginary space
RS Real space

The invention claimed is:

1. A three-dimensional shape measuring apparatus which measures a three-dimensional shape of an object, said three-dimensional shape measuring apparatus comprising:
a mirror which reflects light from the object;
an image capturing unit configured to capture an image including both a real image and a virtual image of the object, the virtual image being formed using said mirror;
a light amount changing unit configured to change a light amount of one of the real image and the virtual image;
an image separating unit configured to separate the real image and the virtual image in the image captured by said image capturing unit; and
a reconstruction unit configured to reconstruct the three-dimensional shape of the object, using the real image and the virtual image that are separated by said image separating unit,
wherein said image capturing unit is configured to capture a first image which is the image influenced by the change caused by said light amount changing unit, and a second image which is the image uninfluenced by the change caused by said light amount changing unit, and
based on a comparison between the first image and the second image, said image separating unit is configured to specify, as the one of the real image and the virtual image, a portion having a difference in light amount greater than or equal to a predetermined threshold between the first image and the second image, and specify, as the other of the real image and the virtual image, a portion having a difference in light amount smaller than the predetermined threshold between the first image and the second image, to separate the real image and the virtual image in the image.

2. The three-dimensional shape measuring apparatus according to claim 1,
wherein said light amount changing unit is configured to change the light amount of the virtual image by changing a light amount of the reflected light reflected by said mirror.

3. The three-dimensional shape measuring apparatus according to claim 1,
wherein said mirror transmits, to a side of a mirror surface which reflects the light from the object, light proceeding to said mirror from a side of a reverse face opposite to the mirror surface, and
said light amount changing unit is configured to change the light amount of the virtual image by changing an amount of the light transmitted to the side of the mirror surface through said mirror.

4. The three-dimensional shape measuring apparatus according to claim 1, comprising
a reference image holding unit configured to hold a reference image that is to be captured by said image capturing unit in the case where no object to be captured by said image capturing unit is present,
wherein said light amount changing unit is configured to change the light amount of the virtual image, and
said image separating unit is configured to cause said image capturing unit to capture the first image during a period when said light amount changing unit changes the light amount, and also cause said image capturing unit to capture the second image during a period when said light amount changing unit does not change the light amount, and to specify, as the real image, from the two images, a portion not included in the reference image that is held and having the same light amount, and specify, as the virtual image, a portion not included in the reference image that is held and having a different light amount.

5. The three-dimensional shape measuring apparatus according to claim 1,
wherein said mirror transmits, to a side of a mirror surface on which said mirror reflects the light from the object, light proceeding to said mirror from a side of a reverse face opposite to the mirror surface, and
said light amount changing unit includes a display unit which is provided at the side of the reverse face of said mirror and is configured to transmit, by displaying an image, light of the displayed image to the side of the mirror surface, so as to change the light amount of the virtual image, using the transmitted light.

6. The three-dimensional shape measuring apparatus according to claim 1,
wherein said light amount changing unit includes a display unit which is provided on a mirror surface on which said mirror reflects the light from the object, and which is configured to change the light amount of the virtual image by displaying an image so as to change the light amount of the virtual image, using the light of the displayed image, and
said display unit is configured to transmit, to a side of the mirror surface of said mirror, the light proceeding from the object, and also re-transmit the light reflected by said mirror and proceeding to said image capturing unit.

7. The three-dimensional shape measuring apparatus according to claim 5,
wherein a color of the image displayed by said display unit is either a color that is not used for the image captured by said image capturing unit when said display unit does not display an image, or a complementary color of a color of the object.

8. The three-dimensional shape measuring apparatus according to claim 1,
wherein said light amount changing unit is configured to change the light amount of the virtual image by blocking at least one of incident light that is incident on said mirror and the reflected light reflected by said mirror.

9. The three-dimensional shape measuring apparatus according to claim 1,
wherein said light amount changing unit is configured to irradiate said mirror with light so as to change a contrast of the virtual image formed with the reflected light reflected by said mirror.

10. The three-dimensional shape measuring apparatus according to claim 1, comprising
a determination unit configured to determine, from among a plurality of mirrors, a mirror in which the light amount is to be changed, and to change the light amount of the virtual image reflected in the determined mirror, using a change unit corresponding to the determined mirror,
wherein said mirror includes said plurality of mirrors,
each of said plurality of mirrors reflects the light proceeding from the object to the each of said plurality of mirrors,
said light amount changing unit includes a plurality of change units each of which corresponds to the each of said plurality of mirrors, and
the each of said plurality of change units is configured to change the light amount of the virtual image formed with light reflected by one of said plurality of mirrors which corresponds to the each of said plurality of change units.

11. The three-dimensional shape measuring apparatus according to claim 1,
wherein said light amount changing unit is configured to change a light amount of light having a predetermined color and included in light of the virtual image,
said image capturing unit includes a first image capturing apparatus and a second image capturing apparatus,
said first image capturing apparatus captures, as the first image, an image formed only with the light having the predetermined color,
said second image capturing apparatus captures, as the second image, an image formed with light which includes light having a color other than the predetermined color,
said image separating unit is configured to specify, as a region for the real image, a portion having the light amount unchanged in the first image, so as to specify, as the real image, a portion included in the second image and corresponding to the specified region, and also to specify, as the virtual image, a portion which is included in the second image and is other than the portion specified as the real image, and
said first image capturing apparatus includes:
an irradiation unit configured to irradiate the light having the predetermined color;
an image capturing unit configured to capture an image of the light irradiated and then reflected by different points in the object; and
a calculating unit configured to calculate a distance that the light travels during a period from a time at which the irradiation is performed to a time at which the light reflected from each of the different points is captured, as a distance from said first image capturing unit to the each of the different points.

12. The three-dimensional shape measuring apparatus according to claim 11,
wherein said mirror transmits, to a side of a mirror surface that reflects the light from the object, light proceeding to said mirror from a side of a reverse face opposite to the mirror surface, and
said light amount changing unit is provided at the side of the reverse face of the object, and is a display unit configured to display the light having the predetermined color onto said mirror when said first image capturing unit captures the first image.

13. The three-dimensional shape measuring apparatus according to claim 11,
wherein said light amount changing unit is provided at a side of a surface of said mirror that reflects, on the surface, the light from the object, and is a filter which does not transmit the light having the predetermined color and included in the light of the virtual image, while, on the other hand, transmitting light having a color other than the predetermined color.

14. An integrated circuit included in a three-dimensional shape measuring apparatus which measures a three-dimensional shape of an object, the three-dimensional shape measuring apparatus also including a mirror which reflects light from the object, an image capturing unit configured to capture an image including both a real image and a virtual image of the object, the virtual image being formed using the mirror, and a light amount changing unit configured to change a light amount of one of the real image and the virtual image, said integrated circuit comprising:
an image separating unit configured to separate the real image and the virtual image in the image captured by the image capturing unit; and
a reconstruction unit configured to reconstruct the three-dimensional shape of the object, using the real image and the virtual image that are separated by said image separating unit,
wherein the image capturing unit is configured to capture a first image which is the image influenced by the change caused by the light amount changing unit, and a second image which is the image uninfluenced by the change caused by the light amount changing unit, and
based on a comparison between the first image and the second image, said image separating unit is configured to specify, as the one of the real image and the virtual image, a portion having a difference in light amount greater than or equal to a predetermined threshold between the first image and the second image, and specify, as the other of the real image and the virtual image, a portion having a difference in light amount smaller than the predetermined threshold between the first image and the second image, to separate the real image and the virtual image in the image.

15. A three-dimensional shape measuring method for measuring a three-dimensional shape of an object, said three-dimensional shape measuring method comprising:
reflecting light from the object using a mirror;
capturing an image including both a real image and a virtual image of the object, the virtual image being formed using the mirror;
changing a light amount of one of the real image and the virtual image;
separating the real image and the virtual image in the image captured in said capturing; and
reconstructing the three-dimensional shape of the object, using the real image and the virtual image that are separated in said separating,
wherein said capturing comprises capturing a first image which is the image influenced by the changing of the light amount caused in said changing, and a second image which is the image uninfluenced by the changing of the light amount caused in said changing, and
based on a comparison between the first image and the second image, said separating comprises specifying, as the one of the real image and the virtual image, a portion having a difference in light amount greater than or equal to a predetermined threshold between the first image and the second image, and specifying, as the other of the real image and the virtual image, a portion having a difference in light amount smaller than the predetermined threshold between the first image and the second image, to separate the real image and the virtual image in the image.

* * * * *